US012450318B2

(12) United States Patent
Coleman et al.

(10) Patent No.: US 12,450,318 B2
(45) Date of Patent: Oct. 21, 2025

(54) NON-FUNGIBLE TOKEN CREATION WORKFLOW WITH AUTOMATED RIGHTS MANAGEMENT

(71) Applicant: Adobe Inc., San Jose, CA (US)

(72) Inventors: David Coleman, Fremont, CA (US); Xuejun Xu, Cupertino, CA (US); Aoran Zheng, Santa Clara, CA (US); Diana Wong, Oakland, CA (US); Ajay Jain, San Jose, CA (US); Tong Sun, San Ramon, CA (US); Abhinav Gurram, Fremont, CA (US); Claire Guo, New York, NY (US); Sruthi Madapoosi Ravi, San Jose, CA (US); Max Ince, Tiburon, CA (US)

(73) Assignee: Adobe Inc., San Jose, CA (US)

( * ) Notice: Subject to any disclaimer, the term of this patent is extended or adjusted under 35 U.S.C. 154(b) by 130 days.

(21) Appl. No.: 18/460,135

(22) Filed: Sep. 1, 2023

(65) Prior Publication Data

US 2025/0077625 A1 Mar. 6, 2025

(51) Int. Cl.
*G06F 21/10* (2013.01)
*G06F 16/23* (2019.01)
G06F 21/62 (2013.01)
H04L 9/00 (2022.01)
H04L 9/32 (2006.01)

(52) U.S. Cl.
CPC .......... *G06F 21/1014* (2023.08); *G06F 16/23* (2019.01); *G06F 21/10* (2013.01); *G06F 21/6272* (2013.01); *H04L 9/3247* (2013.01); *H04L 9/50* (2022.05)

(58) Field of Classification Search
CPC .. G06F 21/1014; G06F 21/6272; G06F 21/10; H04L 9/50; H04L 9/3247
See application file for complete search history.

(56) References Cited

U.S. PATENT DOCUMENTS

| 11,075,891 | B1 * | 7/2021 | Long | H04L 9/3213 |
|---|---|---|---|---|
| 11,790,418 | B1 * | 10/2023 | Jay | H04L 63/12 |
| | | | | 705/26.1 |
| 11,880,824 | B1 * | 1/2024 | Witchey | G06Q 20/3672 |
| 11,973,874 | B1 * | 4/2024 | Mordan | H04L 9/50 |
| 2021/0326872 | A1 * | 10/2021 | Robotham | G06Q 10/083 |
| 2021/0365433 | A1 * | 11/2021 | Heo | G06F 16/2365 |
| 2021/0390161 | A1 * | 12/2021 | Nakadaira | G06F 21/105 |
| 2023/0222491 | A1 * | 7/2023 | Pacella | G06Q 20/06 |
| | | | | 705/69 |
| 2024/0070306 | A1 * | 2/2024 | Jurat | G06F 21/1015 |

* cited by examiner

*Primary Examiner* — Ellen Tran
(74) *Attorney, Agent, or Firm* — Nicholson De Vos Webster & Elliott LLP

(57) ABSTRACT

A digital content management system may include a set of one or more memory components and a set of one or more processing devices coupled to the set of one or more memory components. The set of one or more processing devices to perform operations comprising: obtaining one or more electronic signatures on a digital document to yield an electronically signed digital document, storing the electronically signed digital document at an off-chain address, using a trained machine learning model to create a smart contract, the smart contract comprising a reference to the off-chain address; and deploying the smart contract to a blockchain.

20 Claims, 10 Drawing Sheets

Showcase  GUI 205

HI AVA, SELECT A WORK TO BE THE SUBJECT OF THE AUTOMATED RIGHTS CONTRACT.

210

215

220

NON-FUNGIBLE TOKEN CREATION WORKFLOW WITH AUTOMATED RIGHTS MANAGEMENT

BACKGROUND

The ease with which non-fungible tokens (NFTs) can be minted and smart contracts created with respect to unique digital assets can affect the adoption of NFTs and smart contracts for digital rights management of those assets. Consider an example where a group of people claim ownership of or collaborate on the creation of a unique digital asset, such as a piece of digital art; a virtual collectible, such as a virtual trading card, an in-game item, or a virtual pet; a piece of music; virtual real estate in a virtual world or a metaverse; a virtual good or wearable within a virtual world or an online gaming ecosystem; a domain name; or digital memorabilia, such as a digital ticket, a virtual autograph, or a unique digital representation of a physical item. The group may want to mint and list an NFT linked to the unique digital asset for sale on an NFT marketplace or other online platform or website where users can buy, sell, and trade NFTs. The ease with which the NFT can be minted and deployed to the NFT marketplace can be critically important. For example, if users are required to have technical experience with a specific smart contract programming language, then only the most sophisticated or zealous users may use NFT tools and technologies.

The techniques disclosed herein address these and other issues.

SUMMARY

Introduced here are techniques for a non-fungible token (NFT) creation workflow with automated rights management.

In some embodiments, the techniques disclosed herein relate to a system that includes a set of one or more memory components and a set of one or more processing devices coupled to the set of one or more memory components. The set of one or more processing devices are configured obtain one or more electronic signatures on a digital document to yield an electronically signed digital document, store the electronically signed digital document at an off-chain address, use a trained machine learning model to create a smart contract that includes a reference to the off-chain address, and deploy the smart contract to a blockchain.

In some embodiments, the techniques disclosed herein relate to the system where the set of one or more processing devices are further configured to obtain a set of digital media item metadata about a digital media item and use the set of digital media item metadata to create the digital document.

In some embodiments, the techniques disclosed herein relate the system where the set of one or more processing devices are further configured to create the smart contract to include a mint function configured to record a new non-fungible token (NFT) record for the digital media item to the blockchain that includes an immutable reference to the off-chain address.

In some embodiments, the techniques disclosed herein relate to the system where the set of one or more processing devices are further configured to use the set of digital media item metadata to create the smart contract to include self-executing code that enforces rights in the digital media item.

In some embodiments, the techniques disclosed herein relate to the system where the set of one or more processing devices are further configured to provide a computer graphical user interface for obtaining the set of digital media item metadata. The computer graphical user interface provides graphical user interface controls for specifying a contributor to the digital media item. The set of digital media item metadata includes a particular identity of a particular contributor to the digital media item. The digital document includes the particular identity of the particular contributor to the digital media item. And where the set of one or more processing devices are further configured create the smart contract to include the particular identity of the particular contributor to the digital media item.

In some embodiments, the techniques disclosed herein relate to the system where the particular identity of the particular contributor to the digital media item includes both: (a) an identity of the particular contributor registered with a content management system, and (b) an identifier of a cryptographic wallet associated with the particular contributor.

In some embodiments, the techniques disclosed herein relate to the system where the set of one or more processing devices are further configured to use the set of digital media item metadata to generate a natural language text sequence representing rights in the digital media item, and use the trained machine learning model to obtain self-executing code for inclusion in the smart contract based on providing, as input to the trained machine learning model, the natural language text sequence representing rights in the digital media item.

In some embodiments, the techniques disclosed herein relate to the system where the set of one or more processing devices are further configured to provide a computer graphical user interface for selecting a digital document template from among a plurality of predetermined digital document templates, and use the set of digital media item metadata to create the digital document based on populating a selected digital document template, of the plurality of predetermined digital document templates, with the set of digital media item metadata.

Additional features and advantages of embodiments of the present disclosure will be set forth in the description which follows, and in part will be obvious from the description, or may be learned by the practice of such embodiments.

BRIEF DESCRIPTION OF THE DRAWINGS

The detailed description below refers to the accompanying drawings in which.

DETAILED DESCRIPTION

Figure 1:
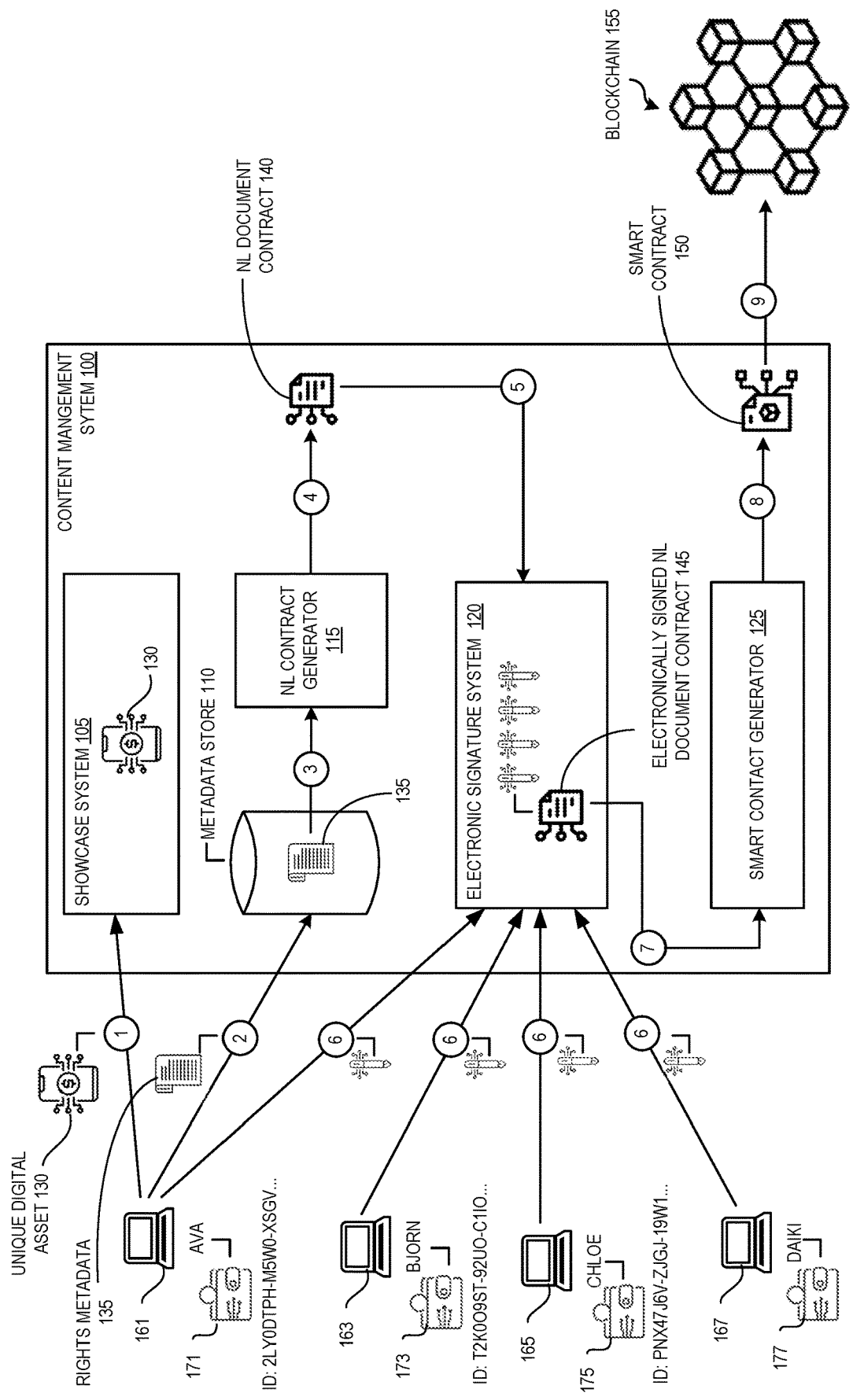
FIG. 1 illustrates an example system and method for a non-fungible token (NFT) creation workflow with automated rights management, according to some embodiments of the disclosure.

Techniques are disclosed for a non-fungible token (NFT) creation workflow with automated rights management. The techniques include deploying a smart contract on a blockchain, where the deployed smart contract immutably refers to a verifiable and trusted electronically signed natural language document contract. The natural language document contract is electronically signed by the contracting parties using a trusted electronic document signature platform that can provide verification of the authenticity of the electronic signatures. In some embodiments, the NFT creation workflow encompasses a system that collects metadata representing the terms and conditions governing a unique digital asset, such as royalty shares among contributors to the unique digital asset. The metadata is used to create the natural language document contract that includes the terms and conditions. Electronic signatures of the contracting parties on the natural language document contract are collected. The smart contract is created to immutably refer to the electronically signed natural language document contract and is deployed to the blockchain, where it can be executed for the NFT.

Existing NFT marketplaces and tools can assist users in programming smart contracts and minting and deploying NFTs onto blockchains. However, these existing marketplaces and tools often require a relatively high level of expertise and familiarity to be used effectively. A user who wishes to mint and deploy an NFT on a blockchain may lack the necessary skills or expertise to utilize these existing marketplaces and tools properly. They may also lack the time or inclination to learn how to use them. Another limitation of existing NFT marketplaces and tools is their emphasis on provable and transferable ownership of unique digital assets, while providing little or no support for proving asset authenticity, configuring rights of use, and establishing configurable royalty payment terms.

Techniques are disclosed for creating an "automated rights contract" as part of the NFT creation workflow. The automated rights contract encompasses the smart contract deployed to the blockchain, which immutably refers to the natural language document contract that is electronically signed by the contracting parties using a trusted electronic document signature platform. The deployed smart contact is configured with self-executing code that is capable of facilitating, verifying, and enforcing terms and conditions of the smart contract using blockchain technology. The electronically signed natural language document contract enables the contract parties and others to read the terms and conditions of the smart contract in a natural language format, without requiring technical expertise in application programming interfaces (APIs) and tools for querying smart contracts on the blockchain. In some embodiments, the automated rights contract provides an immutable, verifiable, and trusted link-separate from NFT ownership-between the creator of the unique digital asset and the NFT minted on the blockchain. In contrast, conventional smart contracts typically focus on NFT ownership. This immutable, verifiable, and trusted link ensures the authenticity of the unique digital asset in terms of its origin/provenance thereby preventing or deterring fraud. In some embodiments, the self-executing code of the smart contract code is generated using machine learning or generative artificial intelligence applied to the natural language document contract.

FIG. 1 illustrates an example system and method for a non-fungible token (NFT) creation workflow with automated rights management, according to some embodiments of the disclosure. Briefly, the example system includes a content management system 100 (referred to as "CMS 100"), a unique digital asset showcase system 105 (referred to as "showcase system 105"), an extensible rights metadata store 110 (referred to as "metadata store 110"), a natural language document contract generator 115 (referred to as "NL contract generator 115"), an electronic signature system 120, and a smart contract generator 125. The example system also includes a blockchain 155 and a set of end-user computing devices 161, 163, 165, and 167 used by example users Ava, Bjorn, Chloe, and Daiki, respectively. Each of these users also possesses a respective cryptocurrency wallet 171, 173, 175, and 177.

The example method is depicted in FIG. 1 by directed arrows with overlaying numbered circles. In the summary, the example method proceeds as follows: Step 1: The "executor" of an automated rights contract (Ava in the example of FIG. 1) uploads or selects a unique digital asset 130 in showcase system 105. Step 2: The executor provides rights metadata 135, which specifies the terms and conditions of the automated rights contract, and it is stored in metadata store 110. Step 3 and Step 4: NL contract generator 115 generates NL document contract 140 from rights metadata 135. Step 5: NL document contract 140 or a reference to it is provided to electronic signature system 120. Step 6: Electronic signature system 120 collects electronic signatures on NL document contract 140 from the parties involved in the automated rights contract (Ava, Bjorn, Chloe, and Daiki in the example of FIG. 1), resulting in an electronically signed NL document contract 145. Step 7: Electronically signed NL document contract 145 or a reference to it is provided to smart contract generator 125. Step 8: Smart contract generator 125 uses the rights metadata 135 stored in metadata store 110 or electronically signed NL document contract 145 to generate a smart contract 150. This smart contract includes self-executing code and an immutable reference to the electronically signed NL document contract 145. Step 9: Smart contract 150, containing the self-executing code and the immutable reference, is deployed to blockchain 155 where it can simultaneously or subsequently be used to mint the NFT for the unique digital asset 130.

As an example, consider a scenario where Ava, Bjorn, Chloe, and Daiki collaborate as co-creators of a unique digital asset. This asset can take the form of a digital representation, comprising one or more files containing formatted data, associated with various types of creative works. Examples include: Graphic design: such as logos, branding materials, illustrations, posters, infographics, packaging designs, and more. Web design: encompassing website designs, user interfaces (UI), user experience (UX) designs, interactive prototypes, responsive layouts, and similar elements. Photography: covering portraits, landscapes, fashion photography, still life compositions, conceptual photography, and more. Motion graphics: involving animated videos, title sequences, explainer videos, visual effects, animated logos, and related content. Illustration: spanning digital illustrations, character designs, concept art, comic art, storyboards, and similar mediums. Typography: including typefaces, calligraphy, hand-lettered designs, typographic compositions, and more. 3D Modeling and Visualization: incorporating digital sculptures, product visualizations, architectural renderings, virtual reality (VR) experiences, animated 3D content, and similar creations. Product design: comprising product concepts, prototypes, CAD models, and related elements. Fashion design: encompassing clothing designs, fashion illustrations, textile patterns, fashion campaigns, and more. Digital art: such as digital paintings, digital collages, generative art, experimental art, mixed-media artwork, and other innovative forms. Any other appropriate type of unique digital asset. These examples serve to illustrate the diverse range of creative works that can be co-created and managed within the context of the disclosed system and method.

For instance, consider a scenario where Ava operates an online business as a creative professional. Ava has created a distinctive digital artwork intended for use in marketing materials or online advertisements. During the creation process, Ava incorporates elements or concepts from unique digital artworks crafted by Bjorn, Chloe, and Daiki. In this case, Ava may desire to mint an NFT (Non-Fungible Token) for her unique digital artwork and list it on an NFT marketplace, ensuring that royalties are distributed to the co-contributors Bjorn, Chloe, and Daiki. The techniques described in this disclosure can assist Ava in accomplishing this objective.

According to the techniques disclosed herein, Ava, as the executor of an automated rights contract for the unique digital artwork, proceeds with step 1 of the example method shown in FIG. 1. The first step involves initiating the process of creating the automated rights contract by uploading the unique digital artwork to the showcase system 105. Alternatively, if the unique digital artwork is already in the showcase system 105, Ava may select the existing unique digital artwork by interfacing with a graphical user interface (GUI) provided by the showcase system 105.

Moving on to step 2, Ava provides rights metadata that specifies the terms and conditions of the automated rights contract. This metadata is stored in metadata store 110. For example, the rights metadata may include information such as the royalty shares for Ava, Bjorn, Chloe, and Daiki, along with other possible terms and conditions.

At steps 3 and 4, the NL contract generator 115 generates a natural language (NL) document contract using the rights metadata provided. Once the NL document contract is generated, it is passed to the electronic signature system 120 at step 5.

In step 6, the electronic signature system 120 collects electronic signatures on the NL document contract from Ava, Bjorn, Chloe, and Daiki. This process results in an electronically signed NL document contract.

Proceeding to step 7, the electronically signed NL document contract or a reference to it is provided to the smart contract generator 125. At step 8, the smart contract generator 125 utilizes the rights metadata stored in the metadata store 110 or the electronic signed NL document contract to generate a smart contract. This smart contract includes self-executing code and an immutable reference to the electronically signed NL document contract.

When step 9 is reached, the smart contract, with the self-executing code and the immutable reference, is deployed to blockchain 155. Additionally, the blockchain can be used, either simultaneously or subsequently, to mint the non-fungible token (NFT) for the unique digital artwork.

Beneficially, with the support of the techniques disclosed herein, Ava can create an automated rights contract that encompasses the smart contract deployed to blockchain 155. This process does not require Ava to possess technical expertise in application programming interfaces (APIs) and tools for directly creating the smart contract on blockchain 155.

The smart contract created includes an immutable reference to the NL document contract that has been electronically signed by Ava, Bjorn, Chloe, and Daiki using the trusted electronic signature system 120. As such, the terms and conditions of the automated rights contract can be viewed (read) in a natural language form.

The deployed smart contract is configured with self-executing code, which enables it to facilitate, verify, and enforce the terms and conditions of the contract using blockchain technology. This includes crediting the cryptographic wallets 171, 173, 175, and 177 of Ava, Bjorn, Chloe, and Daiki, respectively, in accordance with their royalty shares when the NFT is involved in a secondary sale.

Furthermore, as mentioned, the electronically signed NL document contract allows Ava, Bjorn, Chloe, Daiki, and others to easily read the terms and conditions of the smart contract in a natural language format. This accessibility eliminates the need for technical expertise in application programming interfaces (APIs) and tools for querying smart contracts on blockchain 155.

Returning to the example system shown in FIG. 1, it includes CMS 100, which encompasses a collection of web services or online platforms. These include showcase system 105 and electronic signature system 120. A web service or online platform within CMS 100 refers to a software system that facilitates communication and data exchange between different applications or machines over a data network.

For instance, a web service or online platform allows communication between a web application within CMS 100 and end-user computing devices via the internet. To enable this communication and data sharing, a web service or online platform may utilize a set of protocols and standards such as HTTP (Hypertext Transfer Protocol), XML (Extensible Markup Language), JSON (JavaScript Object Notation), or any other appropriate protocol or standard.

The implementation of a web service or online platform can involve various technologies, programming languages, and architectural styles. These may include HTML (Hypertext Markup Language), CSS (Cascading Style Sheets), JavaScript, PHP, Python, Node.js, Ruby, Java, C#/.NET, Representational State Transfer (REST), Simple Object Access Protocol (SOAP), or any other suitable technology, programming language, or architectural style. The choice of these elements depends on the specific requirements and preferences of the CMS 100 system.

In some embodiments, CMS 100 is operated by a single entity, such as a company, business, or website operator. However, in other embodiments, CMS 100 is operated by multiple entities. For instance, CMS 100 can be a federated system where showcase system 105 is operated by one entity, electronic signature system 120 is operated by a second entity, and metadata store 110, NL contract generator 115, and smart contract generator 125 are operated by a third entity.

Alternatively, CMS 100 can be a federated system where showcase system 105 is operated by the first entity, and electronic signature system 120, metadata store 110, NL contract generator 115, and smart contract generator 125 are operated by the second entity. The specific configuration of CMS 100 depends on the particular implementation and requirements.

Regardless of the setup, the components, and sub-systems of CMS 100, including showcase system 105, metadata store 110, NL contract generator 115, electronic signature system 120, and smart contract generator 125, are designed to communicate and interoperate with each other. This enables seamless communication and data sharing, utilizing suitable protocols, standards, and application programming interfaces (APIs). The aforementioned protocols, standards, technologies, programming languages, web service or online platform architectural styles can all be utilized within CMS 100 to facilitate effective operation and coordination among its components and sub-systems.

CMS 100 incorporates showcase system 105, which functions as a web service or online platform dedicated to allowing creative professionals and digital artists to showcase their creative digital works. Specifically, showcase system 105 serves as a social media platform tailored for artists, designers, photographers, illustrators, and other creative individuals to exhibit their digital portfolios and projects.

Within showcase system 105, users are provided with a dedicated space to create profiles and showcase their digital works through project pages. This platform enables users to upload various forms of digital media, including images, videos, and other relevant content, to present their creative projects in a visually captivating manner.

Additionally, users have the option to include project descriptions, details, and tags to provide context and enhance the discoverability of their digital works among other users within showcase system 105. This facilitates a dynamic and interactive environment where artists can effectively share and promote their creative endeavors.

Showcase system 105 offers a range of features designed to enhance the overall creative community experience. These features include but are not limited to: Project Appreciation: Users can express their admiration for projects by utilizing an appreciation feature. This allows them to "like" and provide positive feedback, offering recognition and encouragement to fellow creatives. Following and Networking: Showcase system 105 incorporates a following and networking feature that enables users to connect with other creatives whose work captures their interest. By following each other, users can build a network and stay updated on the latest projects and activities of those they follow. Collections: Within showcase system 105, users have the ability to curate collections of projects based on themes, categories, or personal preferences. This feature allows users to organize and showcase work that inspires or relates to specific topics, providing a means to highlight their favorite projects. Collaboration: Showcase system 105 fosters collaboration among users. It provides a platform for creative professionals to connect with one another, facilitating potential collaborations and job opportunities. This feature serves as a valuable resource for users seeking to engage with like-minded individuals and expand their creative endeavors. These features collectively contribute to an enriching and interactive environment within showcase system 105, fostering engagement, networking, and collaboration among the creative community.

CMS 100 incorporates metadata store 110, which serves as a storage system specifically designed for storing rights metadata. The metadata store 110 can utilize a database management system (DBMS) capable of handling structured data and providing efficient querying and retrieval capabilities.

For instance, metadata store 110 can be implemented using various types of database systems, including a relational database management system, a NoSQL database, a graph database, or a centralized network file system. These systems offer different approaches to storing and managing data, allowing for flexibility based on the specific requirements of CMS 100.

Alternatively, metadata store 110 may encompass a decentralized data store, specifically tailored for storing rights metadata. Examples of such decentralized storage systems include distributed ledger technology like blockchain 155 or content address storage systems like IPFS (InterPlanetary File System), SWARM, and others. These decentralized storage solutions provide robust and secure mechanisms for storing rights metadata in a distributed and tamper-resistant manner.

The choice of the metadata store 110 implementation depends on the desired characteristics, scalability, security, and interoperability requirements of CMS 100, ensuring efficient storage and retrieval of rights metadata within the system.

Preferably, the rights metadata stored in metadata store 110 possesses an attribution quality, allowing for the identification of the user or users who created or modified the rights metadata within the store. This can be achieved by maintaining a journal or history of changes to the rights metadata, ensuring transparency and accountability. In addition to attribution, metadata store 110 should provide robust access control mechanisms. This ensures that only authenticated and authorized users or entities are granted the privileges to create, modify, and read the rights metadata stored within the store. By enforcing access control, CMS 100 maintains the integrity and security of the rights metadata, preventing unauthorized manipulation or disclosure. Furthermore, it is advantageous for metadata store 110 to employ cryptographic encryption techniques to safeguard the rights metadata. Encrypting the rights metadata stored in metadata store 110 adds an extra layer of protection, making it difficult for unauthorized parties to access or decipher the information. This encryption measure helps to ensure the confidentiality and integrity of the rights metadata. By incorporating these features into metadata store 110, CMS 100 establishes a robust and secure environment for storing and managing rights metadata, guaranteeing attribution, access control, and protection against unauthorized access.

CMS 100 includes NL contract generator 115. NL contractor generator 115 encompasses a computer system for generating a natural language document contract from metadata describing rights in a unique digital asset.

Rights metadata for a unique data asset stored in metadata store 110 can reflect various rights in the unique data asset that can be enforced by the smart contract that is generated based on the rights metadata. Example rights that can be reflected by rights metadata include: Ownership Rights: The rights metadata can indicate the ownership of the unique digital asset and define the conditions for transferring or assigning ownership. This information can be used by the smart contract to enforce and validate ownership transfers.

Usage Rights: The rights metadata can specify the permitted uses of the digital asset, such as whether it can be reproduced, modified, or distributed. The smart contract can refer to this metadata to enforce usage restrictions and permissions. Royalty Rights: The rights metadata can include details about royalty shares and payment terms for the unique digital asset. The smart contract can utilize this information to automatically calculate and distribute royalties to the appropriate rights holders based on predefined conditions. Access Rights: The rights metadata can define who has access to the digital asset and under what conditions. This information can be used by the smart contract to enforce access control measures, ensuring that only authorized individuals or entities can view or interact with the asset. Attribution Rights: The rights metadata can include information about the attribution requirements for the digital asset, specifying how the creator or rights holder should be credited when the asset is used or shared. The smart contract can enforce these attribution rights, ensuring proper recognition and compliance. Expiry or Time-based Rights: The rights metadata can include expiration dates or time-based restrictions for the unique digital asset. The smart contract can utilize this information to enforce time-limited rights, such as licensing periods or temporary access permissions. These are some examples of rights that can be reflected by rights metadata for the unique digital asset and enforced by the smart contract. The specific rights and conditions captured in the rights metadata can vary depending on the nature of the unique digital asset and the desired contractual arrangement.

NL contract generator 115 may include different sub-processes or sub-modules to facilitate its functioning. For example, within NL contract generator 115, there may be a metadata extraction sub-process or sub-module responsible for extracting pertinent rights metadata associated with the unique digital asset from metadata store 110. The extracted rights metadata can encompass various information, such as ownership details, usage rights, licensing terms, royalty percentages or shares, copyright information, and any other relevant details pertaining to the rights associated with the unique digital asset. These details are used for accurately capturing and representing the rights within the NL document contract. By employing the metadata extraction sub-process or sub-module, NL contract generator 115 can ensure that the rights metadata retrieved from metadata store 110 is effectively incorporated into the NL document contract, enabling a comprehensive and accurate representation of the rights associated with the unique digital asset.

NL contract generator 115 may include a data mapping sub-process or sub-module responsible for mapping the rights metadata to specific sections or elements within a natural language document contract template. The contract template serves as a predefined structure or blueprint that outlines the required clauses and language for the contract. The data mapping sub-process or sub-module within NL contract generator 115 facilitates the alignment of the extracted rights metadata with the corresponding sections or elements of the contract template. This ensures that the relevant information captured in the rights metadata is appropriately inserted into the appropriate sections or placeholders within the natural language document contract. By utilizing the data mapping sub-process or sub-module, NL contract generator 115 ensures a seamless integration of the rights metadata with the contract template, resulting in a comprehensive and accurate representation of the rights and associated terms within the final NL document contract.

NL contract generator 115 may include a sub-process or sub-module known as the natural language contract template selection. This component is responsible for choosing the suitable natural language document contract template from a library of available templates. The selection process can be based on user input, such as preferences provided by the executor of the automated rights contract. Alternatively, other relevant criteria, such as the specific type of rights associated with the unique digital asset or legal requirements, can be considered for template selection. The chosen template will typically encompass the fundamental terms and conditions that pertain to the rights of the unique digital asset. This includes aspects such as usage rights, royalties, licensing, and other essential contractual elements. The selected template provides a foundation for constructing the NL document contract, ensuring that the key provisions align with the specific rights and requirements associated with the unique digital asset. By incorporating the natural language contract template selection sub-process or sub-module within NL contract generator 115, the system can streamline the process of creating the NL document contract. This ensures that the appropriate template is selected, covering the essential terms and conditions relevant to the unique digital asset's rights and facilitating a more efficient and accurate contract generation process.

NL contract generator 115 may include a variable insertion sub-process or sub-module, which is responsible for inserting the mapped rights metadata into the contract template. This sub-process replaces predefined variables or placeholders within the template with the corresponding rights metadata extracted and mapped from earlier stages. During the variable insertion process, the NL contract generator 115 seamlessly integrates the specific details and information from the rights metadata into the appropriate locations within the contract template. This ensures that the finalized NL document contract accurately reflects the terms and conditions associated with the unique digital asset. By utilizing the variable insertion sub-process or sub-module, NL contract generator 115 automates the task of populating the contract template with the relevant rights metadata. This streamlines the process of generating the NL document contract and results in a comprehensive and customized contract that reflects the specific rights and terms of the unique digital asset.

NL contractor generator 115 may populate the template with the extracted metadata to ensure the generated NL document contract reflects the specific details of the unique digital asset and the associated rights metadata. NL contract generator 115 may include a natural language generation sub-process or sub-module. This sub-process can employ various techniques, including rule-based, machine learning-based, or generative artificial intelligence-based approaches, to generate human-readable text based on the populated contract template and rights metadata. The goal is to produce coherent and understandable sentences and paragraphs in a natural language format.

The natural language generation sub-process within NL contract generator 115 takes the populated contract template, which incorporates the specific details from the rights metadata, and transforms it into a final NL document contract. By leveraging rule-based systems, machine learning algorithms, or generative AI models, the sub-process generates text that is fluent, cohesive, and comprehensible to users. The generated text aims to present the contractual terms and conditions in a clear and natural manner, ensuring that the NL document contract is easily readable and understandable by the involved parties. This enhances transparency, readability, and accessibility, enabling users to grasp the contractual rights and obligations associated with the unique digital asset with ease. Through the natural language generation sub-process or sub-module, NL contract generator 115 facilitates the conversion of the populated contract template and rights metadata into a human-readable NL document contract, providing a user-friendly representation of the contractual terms in a natural language format.

CMS 100 includes electronic signature system 120, which serves as a web service or online platform designed to facilitate the electronic signing of documents, including the automation of the document signing process. Electronic signature system 120 offers various features and capabilities, including a legally binding mechanism for signing documents electronically. Users can sign documents using their end-user computing devices, employing methods such as using a mouse, touchpad, touchscreen, stylus, or even uploading an image of their signature, among other suitable means of signature capture. The electronic signatures generated through electronic signature system 120 are secure, verifiable, and compliant with one or more electronic signature standards and regulations. Examples of such standards and regulations include the ESIGN Act (Electronic Signatures in Global and National Commerce Act), UETA (Uniform Electronic Transactions Act), eIDAS Regulation (Electronic Identification, Authentication, and Trust Services), European Telecommunications Standards Institute (ETSI) standards, International Organization for Standardization (ISO) standards (such as ISO 32000-1 for PDF specification, ISO 19005-1 for PDF/A, and ISO 27001 for information security management), U.S. Food and Drug Administration (FDA) regulation 21 CFR Part 11, Asia-Pacific Economic Cooperation (APEC) model framework, and other relevant electronic signature standards or regulations. By adhering to some or all of these standards and regulations, electronic signature system 120 ensures that the signed documents are legally valid, providing a secure and reliable solution for executing electronic signatures within the CMS 100 environment.

Electronic signature system 120 is designed to be accessible and usable across various end-user computing devices and platforms. This includes, but is not limited to, web browsers, mobile computing devices, and tablet computers. Users can conveniently sign and send documents from anywhere, as the electronic signature system 120 supports mobility. Signers have the flexibility to use their mobile devices, such as smartphones or tablets, to sign documents. This can be done through a dedicated mobile application (mobile app) or a web-based application (web app). The availability of both mobile and web applications allows signers to easily and conveniently execute electronic signatures using their preferred device, providing a user-friendly and flexible signing experience. By offering compatibility across different end-user computing devices and platforms, electronic signature system 120 ensures that users can seamlessly access and utilize the system's signing capabilities, empowering them to sign documents on-the-go, regardless of the device they choose to use.

Electronic signature system 120 provides real-time or near real-time tracking and visibility into the status of documents sent out for signature. This functionality enables users to monitor and receive updates on the progress of the signing process. Users can track key information such as who has received, viewed, and signed the document, allowing for effective document management and follow-up. Furthermore, electronic signature system 120 offers detailed audit trails that comprehensively track each step of the signing process. These audit trails ensure transparency and compliance by recording essential information such as the date and time of document access, views, and signatures. By maintaining thorough records of the signing activities, the system promotes accountability and provides an auditable trail for legal and regulatory purposes. By combining real-time tracking and visibility features with detailed audit trails, electronic signature system 120 enhances transparency, facilitates efficient document management, and helps ensure compliance with relevant regulations and requirements. Users can confidently rely on the system to maintain a clear and accurate record of the signing process.

Electronic signature system 120 adheres to stringent security measures aimed at protecting document integrity and user data. The system employs encryption, authentication, and advanced security controls to safeguard sensitive information. These security measures ensure the confidentiality and integrity of the documents and data processed within the system. Moreover, electronic signature system 120 ensures compliance with various industry standards and regulations, such as eIDAS (Electronic Identification, Authentication, and Trust Services), UETA (Uniform Electronic Transactions Act), PDF Advanced Electronic Signatures (PAdES), XML Advanced Electronic Signatures (XAdES), CMS Advanced Electronic Signatures (CAdES), or the like. Compliance with these standards and regulations validates the legality and validity of electronic signatures generated through the system. By implementing robust security measures and complying with industry standards and regulations, electronic signature system 120 provides users with a secure and trusted environment for executing electronic signatures. The system prioritizes the protection of document integrity and user data, reinforcing the reliability and legal validity of the electronic signing process.

CMS 100 incorporates smart contract generator 125, which is a computer system designed to generate a smart contract for a unique digital asset. The generated smart contract includes self-executing code that defines the behavior and logic governing the operations and outcomes of the automated rights contract. The self-executing code within the smart contract is typically specified in a programming language specifically designed for smart contract execution on blockchain 155. Examples of such languages include MOVE, SOLIDITY, VYPER, CADENCE, RUST, PLUTUS, or other suitable smart contract programming languages. These languages enable the implementation of the required functionalities and rules within the smart contract. The self-executing nature of the smart contract eliminates the need for intermediaries or manual intervention. Once the smart contract is deployed to blockchain 155, the self-executing code autonomously executes according to the predefined rules and conditions specified within the contract. This automation ensures the reliable and immutable execution of the contract, reducing the reliance on third parties and enhancing the efficiency and transparency of the automated rights contract.

The generated smart contract is designed to adhere to a predefined specification or set of guidelines, commonly known as standards. These standards promote interoperability, consistency, and compatibility among different smart contracts deployed on blockchain 155. By adhering to these standards, smart contracts can effectively interact with each other, be comprehensible to developers, and seamlessly integrate into decentralized applications and ecosystems. The standards provide a common set of functions and interfaces that define the core functionality of non-fungible tokens (NFTs). These functions and interfaces enable the standardized representation, transfer, and management of NFTs within the blockchain ecosystem. They ensure that NFT smart contracts conform to a unified structure and behavior, simplifying their integration and usage across different platforms and applications. For instance, the generated smart contract may adhere to one or more of the following standards: ERC-721 (Ethereum Request for Comment 721), ERC-1155, TRC-721 (TRON Request for Comment 721), BEP-721 (Binance Evolution Proposal 721), BEP-1155, or any other suitable smart contract standard for NFTs. These standards provide well-defined specifications for NFT functionality, enhancing the interoperability and compatibility of NFT smart contracts within the blockchain ecosystem. By adhering to these standards, the generated smart contract ensures that the NFT it represents can seamlessly interact with other NFTs, decentralized applications, and platforms, promoting a vibrant and interconnected ecosystem for unique digital assets.

While in some embodiments, the generated smart contract may adhere to a standard for non-fungible tokens (NFTs) on blockchain 155, it is important to note that the smart contract can also be in a proprietary format specific to certain blockchain platforms or ecosystems supported by blockchain 155. These proprietary formats are designed to cater to the unique requirements and functionalities of specific projects or applications within the blockchain ecosystem. For example, the generated smart contract may be in a proprietary format associated with platforms such as CRYPTO-KITTIES, DECENTRALAND, NBA TOP SHOT, AXIE INFINITY, or other similar projects. These proprietary formats provide a customized structure and behavior specifically tailored to the needs of these platforms or applications. The choice of a proprietary format allows for flexibility and customization, enabling the smart contract to effectively support the unique features and functionalities offered by specific blockchain platforms or ecosystems. This ensures compatibility and seamless integration with the corresponding project or application.

In some embodiments, smart contract generator 125 generates the smart contract based on the rights metadata stored in metadata store 110 for the unique digital asset. To accomplish this, smart contract generator 125 may include a smart contract compiler responsible for converting the structured data format of the rights metadata provided by metadata store 110 (such as JSON, XML, or other structured data format) into a format compatible with execution on blockchain 155.

The smart contract compiler performs various operations to facilitate this conversion. These operations may include lexical analysis, syntactic analysis (parsing), semantic analysis, intermediate code generation, optimization, target code generation, and other relevant compilation processes. Lexical analysis involves breaking down the rights metadata into individual tokens, such as keywords, identifiers, operators, and literals.

Syntactic analysis (parsing) ensures that the arrangement and structure of the rights metadata tokens adhere to the rules defined by a grammar for the rights metadata, thereby confirming the correct syntax of the rights metadata. Semantic analysis conducted by the smart contract compiler involves examining the meaning and context of the rights metadata.

Once the smart contract compiler verifies the rights metadata's syntactic and semantic accuracy, it generates intermediate code representations, such as an abstract syntax tree (AST) or other tree-based structures, to capture the structure and relationships within the rights metadata. The smart contract compiler may further analyze and optimize the intermediate code to enhance the efficiency, performance, and resource usage of the resulting self-executing code within the smart contract.

Finally, the smart contract compiler generates the target self-executing code specific to the blockchain platform supported by blockchain 155, where the smart contract will be deployed. This may involve generating executable code, bytecode, or machine code formats that can be executed by blockchain 155.

By utilizing the smart contract compiler, smart contract generator 125 ensures the successful transformation of rights metadata into a compatible and executable smart contract on blockchain 155, thereby enabling the automated execution of the defined rights and behaviors within the contract.

Once smart contract generator 125 has generated the smart contract, it can be deployed to blockchain 155. Blockchain 155 is configured with a virtual machine or other processor, such as the Ethereum Virtual Machine (EVM) or the Binance Smart Chain Virtual Machine (BVM), capable of interpreting and executing the compiled self-executing code of the smart contract.

Upon deployment to blockchain 155, the smart contract can immediately begin performing its intended functions through the execution of the self-executing code. These functions may include NFT minting, NFT ownership transfer, NFT royalty or revenue sharing, NFT access control, enforcement of time-limited usage or licensing conditions for NFTs, storage of metadata and information associated with an NFT, including an immutable reference to the electronically signed NL document contract for the unique digital asset, integration with NFT marketplaces or applications, and other relevant smart contract functionalities.

The self-executing code within the deployed smart contract ensures the automated and reliable execution of these intended functions. It enables the smart contract to operate independently without the need for manual intervention or intermediaries, providing a decentralized and trustless environment for carrying out the specified actions.

By deploying the smart contract to blockchain 155, the system can effectively leverage the power of blockchain technology to enable and enforce various functionalities related to NFTs, enhancing their creation, ownership, transfer, and associated rights management.

In addition to, or as an alternative to, using a smart contract compiler, smart contract generator 125 incorporates the use of a large language model (LLM) to generate the smart contract. This approach involves leveraging an LLM, such as GPT2, GPT3, T5, Turing-NLG, or similar models, to generate the smart contract based on the NL document contract generated by NL generator 115 for the unique digital asset.

To accomplish this, a pre-trained LLM is employed, which may have undergone fine-tuning in a low resource manner through techniques like prompting or few-shot learning. The fine-tuning process involves utilizing pairs of natural language contractual clauses and corresponding segments of self-executing code from smart contracts.

For instance, the pre-trained LLM can be trained on a relatively small corpus of NL document contract clauses and self-executing smart contract code segments. Although the training corpus may be smaller compared to the original training data used for the LLM, it provides the necessary information to enable the LLM to generate appropriate smart contract code segments based on the NL document contract clauses.

By utilizing the capabilities of the pre-trained LLM, smart contract generator 125 can generate the smart contract by leveraging natural language processing and generation techniques. This approach offers flexibility and adaptability in generating the self-executing code based on the NL document contract, providing an alternative method for creating the smart contract for the unique digital asset.

At inference time, smart contract generator 125 performs pre-processing on the natural language document contract to prepare it for input into the trained LLM. This pre-processing involves actions such as removing or disregarding irrelevant contract sections, standardizing terminology, and extracting essential clauses and conditions pertaining to the rights associated with the digital asset.

Subsequently, smart contract generator 125 utilizes the trained LLM or other text-to-code generation techniques to generate self-executing code based on the NL document contract or the extracted clauses and conditions. The output produced by the trained LLM may encompass self-executing code, code snippets, or complete code structures that implement the rights, clauses, or conditions expressed in the NL document contract generated by NL contract generator 115 for the unique digital asset.

Following the generation process, smart contract generator 125 undertakes post-processing steps to refine and validate the generated self-executing smart contract code. This includes verifying the syntax, resolving ambiguities, ensuring compliance with programming language requirements and the specific requirements of blockchain 155. Additionally, the generated smart code or self-executing code is checked to ensure its accurate reflection of the rights, clauses, and conditions specified in the NL document contract.

Moreover, smart contract generator 125 conducts testing on the generated self-executing code to ensure its functionality and compliance with the intended rights or the requirements of blockchain 155. Thorough testing helps verify that the generated code operates as intended and aligns with the specified rights and conditions.

Once the testing phase is complete, smart contract generator 125 proceeds to deploy the smart contract onto blockchain 155. Upon deployment, the smart contract becomes executable and automatically enforces the specified rights within the digital asset. This automation ensures that the defined rights are upheld based on the generated self-executing code, providing an efficient and reliable mechanism for enforcing the intended rights in the digital asset.

Smart contract generator 125 generates the smart contract with an immutable reference to the electronically signed NL document contract for the unique digital asset. This reference is typically included in a dedicated metadata portion or section within the smart contract.

The reference takes the form of a uniform resource indicator (URI), uniform resource locator (URL), or another network address that points to the location of the electronically signed NL document contract. This reference serves to retrieve or access the electronically signed NL document contract, which is typically hosted by electronic signature system 120, but may be hosted elsewhere (e.g., at a centralized online network file system).

By utilizing the reference, a suitable software application such as a web browser or mobile application enables authenticated and authorized users to access the natural language representation of the electronically signed NL document contract. This allows users to read and comprehend the expressed rights within the unique digital asset in a human-readable and natural language format.

Additionally, the reference facilitates the identification of the signatories who have endorsed the contract with their electronic signatures. Authenticated and authorized users can access this information, enabling them to ascertain the individuals who have formally signed the contract.

Overall, the inclusion of the immutable reference within the smart contract enhances transparency and accessibility by providing a means to access the electronically signed NL document contract and view its contents in a natural language format. This promotes clarity and comprehension of the rights associated with the unique digital asset for authenticated and authorized users.

The reference to the electronically signed NL document contract within the smart contract is immutable once the smart contract is deployed to blockchain 155. This immutability stems from a fundamental characteristic of blockchain 155. Once a smart contract is deployed and recorded on blockchain 155, it becomes an integral part of a permanent, tamper-evident transaction history.

The decentralized nature of blockchain 155 ensures that no single entity has control over the deployed smart contract, rendering it resistant to unauthorized modifications. The immutability of blockchain data, including smart contracts, is achieved through the utilization of cryptographic hashes and Merkle trees. These mechanisms ensure the integrity and immutability of the data stored on blockchain 155.

Modifying the reference to the electronically signed NL document contract or any other aspect of the deployed smart contract would necessitate altering the entire transaction history of blockchain 155. However, due to the distributed nature of blockchain 155 and the computational effort involved, such modifications are practically infeasible.

As a result, the reference to the electronically signed NL document contract within the smart contract remains unalterable, preserving the integrity and reliability of the contractual information associated with the unique digital asset. This immutability strengthens the trustworthiness and security of the smart contract system, ensuring that the specified rights and contractual terms remain immutable and unchangeable once deployed on blockchain 155.

The example system incorporates blockchain 155, which functions as a distributed and decentralized digital ledger. Blockchain 155 facilitates the recording of transactions across multiple computers or nodes within a network. This transparent and secure system provides a means to verify and record transactions, fostering trust and integrity among participants without relying on central authority.

By leveraging the distributed nature of blockchain 155, transactions are transparently and immutably stored on the ledger, making it difficult for any single entity to manipulate or alter the recorded data. The decentralized nature of blockchain 155 ensures that no central authority has complete control, promoting a trustless and resilient environment for transaction verification and recording.

Blockchain 155 organizes transactions into blocks, which are then linked together using a cryptographic hash function, creating a chain-like structure. This linking mechanism ensures the immutability and integrity of the data stored within the blockchain.

Operating in a decentralized manner, blockchain 155 functions without the need for a single central authority. The ledger of blockchain 155 is replicated and maintained by multiple nodes in a peer-to-peer network. These nodes collaborate to validate and reach a consensus on the transactions recorded in blockchain 155.

The transparent nature of blockchain 155 allows all participants within the network to have visibility into the recorded transactions. Anyone in the network can access and view the transactions and associated data stored in blockchain 155. This transparency fosters accountability and trust among the participants, as it enables them to independently verify and validate the recorded transactions.

Blockchain 155 leverages cryptographic techniques to enhance the security and integrity of transactions. Each block within the blockchain is protected using a hash function, making it computationally infeasible to tamper with the data in a block without modifying subsequent blocks. This ensures the recorded history of blockchain 155 remains unaltered. Once a transaction is recorded in blockchain 155, it becomes exceedingly difficult, if not computationally impractical, to permanently alter or delete it.

The distributed and decentralized nature of blockchain 155, in combination with cryptographic hashing, guarantees the immutability of the data stored within the blockchain. This means that once a transaction is confirmed and added to the blockchain, it becomes a permanent and verifiable part of the ledger.

To ensure agreement among participating nodes regarding the validity of transactions, blockchain 155 employs a consensus algorithm. Consensus mechanisms like proof-of-work (PoW), proof-of-stake (PoS), or other suitable algorithms dictate how nodes within blockchain 155 validate and add new blocks to the chain. These consensus algorithms contribute to the security and reliability of the blockchain system, ensuring that transactions are validated and added to the blockchain in a trustworthy and agreed-upon manner.

Blockchain 155 serves as a platform that facilitates the creation of decentralized applications and smart contracts. It enables the creation and execution of smart contracts, which can be seen as self-executing agreements with the contract terms encoded directly into the underlying code. Smart contracts empower the development of decentralized applications by defining the roles and logic of various participants. They automate the execution of agreements, eliminating the need for intermediaries and enabling direct interaction between parties involved in the contract. By leveraging the capabilities of blockchain 155, smart contracts offer increased transparency, security, and efficiency in carrying out transactions and agreements. They provide a reliable and tamper-proof mechanism for executing and enforcing contractual terms within decentralized applications.

The example system includes end-user computing devices 161, 163, 165, and 167 used by users Ava, Bjorn, Chloe, and Daiki, respectively. An end-user computing device can be one of various types of computing devices including, for example, any of: a smartphone, a personal computer (PC), a laptop computer, a tablet computer, or other personal computing device.

The example system features cryptocurrency wallets 171, 173, 175, and 177, which belong to users Ava, Bjorn, Chloe, and Daiki, respectively. A cryptocurrency wallet is a digital application, device, or service that enables individuals to securely store, manage, and interact with their cryptocurrencies. It provides a secure storage space for cryptographic keys, known as private keys, which are necessary for accessing and controlling one's cryptocurrency assets on a blockchain, such as blockchain 155.

A cryptocurrency wallet can take the form of software installed on various personal computing devices, including desktop computers, smartphones, laptop computers, or tablet computers. The software wallet generates and stores the private keys locally on the device where it is installed. If the software wallet is installed on a personal computer or laptop, it is commonly referred to as a "desktop" wallet. On the other hand, if the software wallet is installed on a smartphone or tablet, it is typically known as a "mobile" wallet.

Alternatively, a cryptocurrency wallet can be a hardware wallet, which is a physical device designed to store private keys offline. These hardware wallets offer enhanced security by keeping private keys isolated from internet-connected devices. They often come in the form of USB devices or other small peripherals with built-in screens or buttons for secure key management.

Another type of cryptocurrency wallet is a web-based wallet, which is accessed through a web browser and hosted on a third-party website or cryptocurrency exchange. Users can access their web-based wallets by logging into a web interface. While web-based wallets offer convenience, their security implications are a consideration as the private keys may be stored by the web-based wallet service provider.

Each cryptocurrency wallet 171, 173, 175, and 177 has a public identifier referred to as the wallet ID and sometimes called the wallet address or the wallet public key. The wallet ID is a unique identifier associated with a cryptocurrency wallet. The wallet ID is a string of alphanumeric characters that serves as a destination or recipient address for cryptocurrency transactions. A wallet ID is derived from the wallet's public key, which is generated using cryptographic algorithms. When users want to receive cryptocurrency from someone else, they provide their wallet ID as the recipient address. This wallet ID is used to identify and route the transaction to the correct wallet within the cryptocurrency network. Each cryptocurrency network, such as Bitcoin or Ethereum, has its own format and structure for wallet IDs.

Returning to the top of the example method of FIG. 1, at step 1, the "executor" of an automated rights contract (Ava in the example of FIG. 1) uploads or selects the unique digital asset 130 in showcase system 105. Ava accomplishes this by using her personal computing device, which is configured with a command-line interface (CLI), a graphical user interface (GUI), an application programming interface (API), or a software development kit (SDK) to interface with showcase system 105 over a data network, such as the internet.

For instance, Ava may log in to her user account held with CMS 100 or showcase system 105. Once logged in, Ava can use her personal computing device to upload the unique digital asset 130 to showcase system 105. Subsequently, Ava can select the uploaded unique digital asset 130 to be the subject of the automated rights contract via the CLI, GUI, API, or SDK. Alternatively, if the unique digital asset 130 was previously uploaded or obtained by showcase system 105, Ava can use her personal computing device to select the unique digital asset 130 as the subject of the automated rights contract via the CLI, GUI, API, or SDK.

Figure 2:
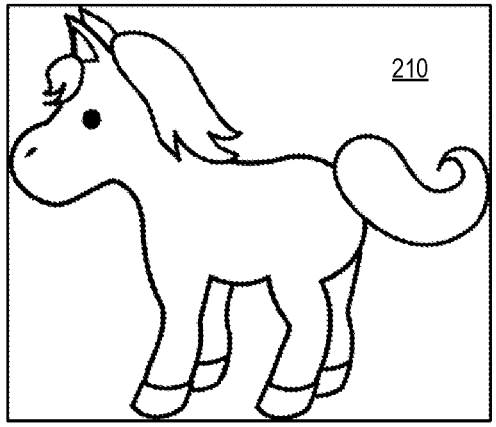
FIG. 2 illustrates an example graphical user interface (GUI) for selecting a unique digital asset to be the subject of an automated rights contract, as per some embodiments of the disclosure.
Figure 2:
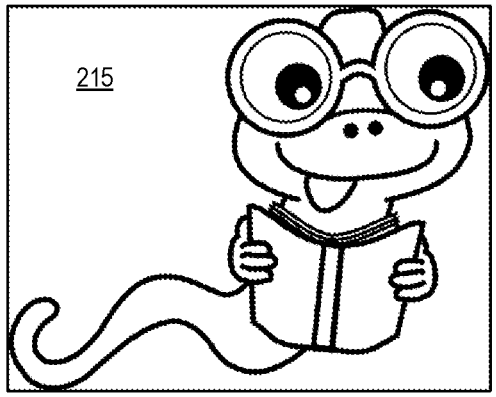
Figure 2:
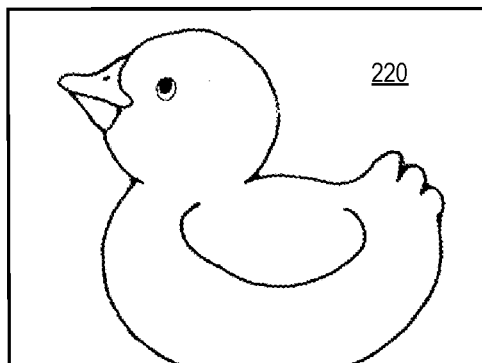

FIG. 2 illustrates an example graphical user interface (GUI) for selecting a unique digital asset to be the subject of an automated rights contract, as per some embodiments of the disclosure. In this scenario, Personal computing device 200 is depicted as a smartphone with a touchscreen video display that shows GUI 205. After user Ava logs in to showcase system 105, GUI 205 is presented on the video display.

Within GUI 205, a collection of unique digital assets associated with Ava's user account is displayed. These assets are represented by selectable thumbnail or hero images arranged in a scrollable or browsable user interface. Ava can conveniently scroll or browse through the collection of unique digital assets, enabling her to find or discover a particular asset associated with her account that she is interested in using for the purpose of creating the automated rights contract.

The disclosed techniques are not limited to GUI 205, and various other types of graphical user interfaces can be utilized for discovering or finding a unique digital asset of interest for the automated rights contract. Examples of possible graphical user interfaces include: Text-based search interface: Ava can enter keywords or phrases in a search box to find relevant unique digital assets. The search results can be displayed in a list format or any other suitable format. Filter-based interface: Ava can refine their search or browse their unique digital assets by applying filters based on criteria like category, date, creator tags, content tags, etc. This allows for narrowing down the assets and obtaining more specific results. Faceted search interface: Combining text-based search with filters, Ava is presented with a set of categories or facets related to their unique digital assets. Ava can select multiple facets to further refine their search results. Grid interface: Thumbnails or hero images of unique digital assets are displayed in a grid format, allowing Ava to view multiple assets at once. Carousel interface: Unique digital assets are showcased as a rotating set of thumbnails or hero images in a horizontal layout. Ava can scroll through the carousel to view different assets. Recommendation interface: Algorithms, including machine learning algorithms, utilize user behavior data to suggest unique digital assets based on Ava's preferences, previous interactions, or choices made by similar users. Recommendations can be presented in various formats such as a list, grid, or carousel. These examples highlight the versatility of graphical user interfaces in facilitating the discovery and selection of unique digital assets for the purpose of creating automated rights contracts.

At step 2, as the executor of the automated rights contract, Ava provides rights metadata 135 that specifies the terms and conditions of the contract. Ava accomplishes this by utilizing her personal computing device, which is equipped with a command line interface (CLI), a graphical user interface (GUI), an application programming interface (API), or a software development kit (SDK) to interface with either showcase system 105 or metadata store 110 over a data network (such as the internet). After selecting unique digital asset 130 to be the subject of the automated rights contract, Ava may be presented with a graphical user interface that allows her to input the rights metadata 134.

Figure 3:
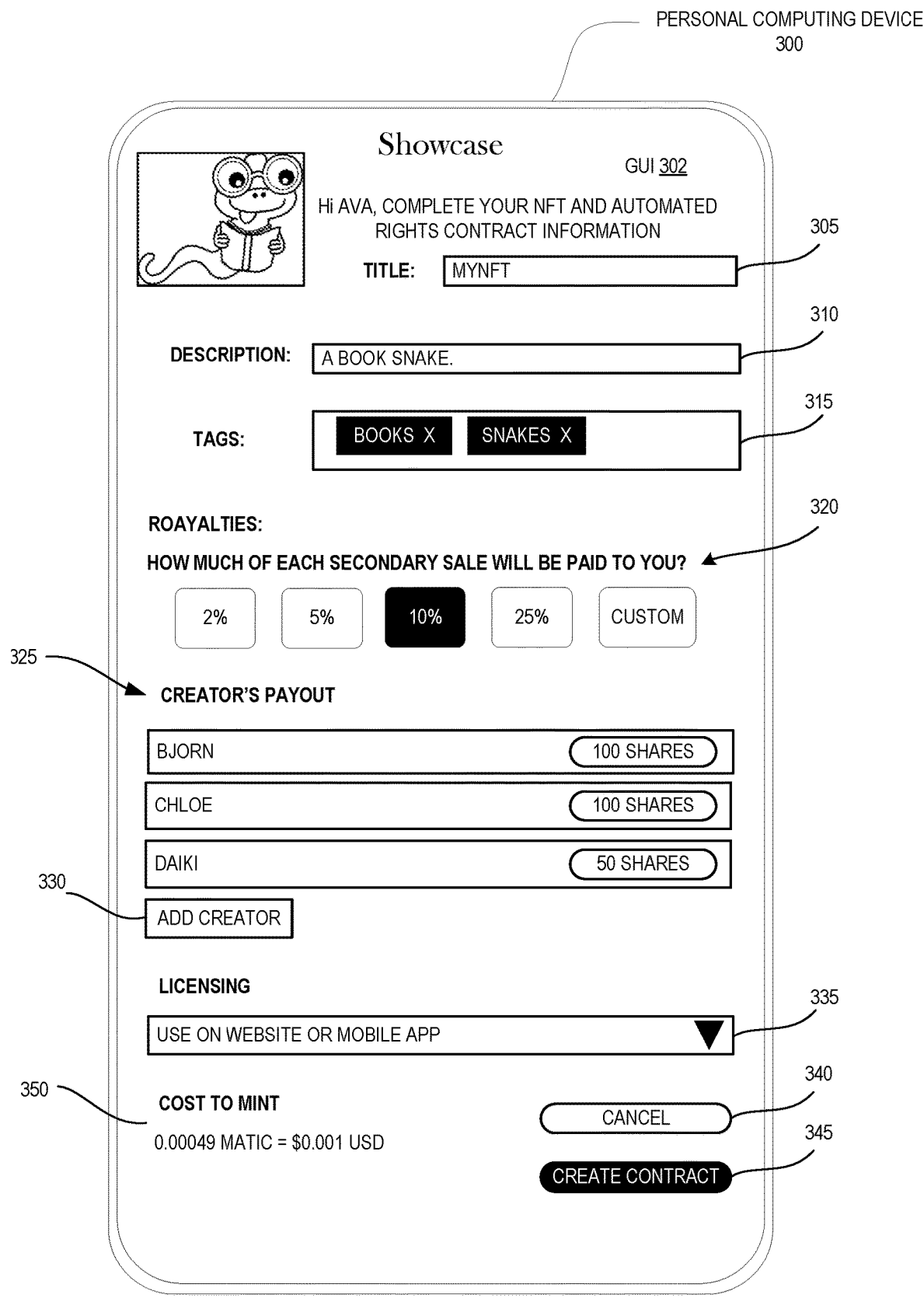
FIG. 3 depicts an example graphical user interface used to provide rights metadata for a unique digital asset selected as the subject of an automated rights contract, according to the disclosure's embodiments.

FIG. 3 depicts an example graphical user interface used to provide rights metadata for a unique digital asset selected as the subject of an automated rights contract, according to the disclosure's embodiments. Personal computing device 300, a smartphone with a touchscreen display, showcases GUI 302 on its video display. GUI 302 is presented after user Ava selects the unique digital asset thumbnail or hero image 215 in GUI 202, as illustrated in FIG. 2. GUI 302 prompts Ava to input the rights metadata 135 for the chosen unique digital asset 130.

In this example, rights metadata 135 includes various fields such as title 305, description 310, tags 315, royalties 320, creator's payout 325, and licensing 335. GUI 302 provides graphical user interface controls for Ava to specify the title 305 of the unique digital asset, which, in this case, is set as "MYNFT." Additionally, GUI 302 offers controls for Ava to input the description 310, where the provided example is "A book snake." Ava can also assign one or more text tags 315 to the asset, and in this instance, "BOOKS" and "SNAKES" have been assigned as tags.

Furthermore, GUI 302 presents controls for specifying royalties 320 to be received by the executor of the automated rights contract, who may also be a creator or co-creator of the unique digital asset. In this example, the graphical user interface controls for royalties 320 allow Ava to select a percentage amount that will be paid to them for each secondary sale of the NFT associated with the unique digital asset. The chosen percentage is 10%, but it can also be set to no royalty (0%) or any other desired percentage.

Additionally, GUI 3025 provides graphical user interface controls 330 for specifying the creators/contributors of/to the unique digital asset and their associated royalty shares 325. Ava has utilized controls 330 to designate Bjorn, Chloe, and Daiki as creators/contributors and to allocate their respective royalty shares for each secondary sale of the NFT. Ava can select the creators/contributors using controls 330 in various ways including by their usernames, user IDs, crypto wallet IDs, e-mail addresses or other user identifiers registered or known to CMS 100, showcase system 105, or metadata store 110.

Other possible ways for Ava to select creators/contributors 330 include: Contact Lists or Address Books: CMS 100, showcase system 105, or metadata store 110 may provide a contact list or address book feature where Ava can maintain a list of other users' information, such as names, email addresses, or phone numbers. Ava can use controls 330 to select other users from their contact list or address book as creators/contributors. Search Functionality: CMS 100, showcase system 105, or metadata store 110 may include search functionality that allows Ava to search for other users based on specific criteria such as name, department, job title, or other attributes. Ava can use controls 330 to enter relevant search terms to find and select other users. Directory Services: CMS 100, showcase system 105, or metadata store 110 may implement directory services that provide a centralized repository of user information, including user profiles, contact details, and organizational hierarchies. Ava can use controls 330 to navigate through the directory to find and select other users. Group or Team Memberships: CMS 100, showcase system 105, or metadata store 110 may allow users to form groups or teams for collaborative purposes. Within such a group or team, Ava as a member of the group or team can use controls 330 to select other members of the group or team as creators/contributors. Social Networking Features: CMS 100, showcase system 105, or metadata store 110 may incorporate social networking features where Ava can connect with others and build a network of connections. Ava can use controls 330 to add users in their network of connections as creators/contributors. These are just a few examples of how Ava might select creators/contributors using controls 330. The specific methods available will depend on the functionality and features provided by the system itself.

GUI 302 also provides graphical user interface controls 335 for selecting licensing terms of the automated rights contracts. In this example, controls 335 have been used to select a licensing term that limits the use of the unique digital asset to use on a website or mobile application. The terms and conditions for licensing can vary depending on the requirements of the specific automated rights contract. Controls 335 may provide a set of predefined licensing terms and conditions from which to select from. For example, the set of predefined licensing terms and conditions may encompass any or all of: Ownership Rights: The NFT holder is granted ownership rights to the unique digital asset represented by the NFT such as the right to display, share, and transfer the NFT. Usage Rights: The license may specify the permitted uses of the NFT. For example, it could grant personal or non-commercial use, or it could allow for commercial exploitation, reproduction, or display of the associated unique digital asset. Royalties: As mentioned, the smart contract may enforce a royalty mechanism, where one or more creators, contributors, or rights holders are entitled to a percentage of future sales or transfers of the NFT. Provenance and Attribution: The license may require proper attribution and acknowledgment of the original creator when the NFT is displayed or shared. It can also include information about the history and provenance of the NFT. Time-Limited Licenses: The license may have a defined duration during which the NFT holder has rights to the unique digital asset. After the license period expires, the rights may revert to the original creator or another designated party. Restricted Use: The license terms may impose restrictions on certain uses of the NFT, such as prohibiting the creation of derivative works, reselling or transferring the NFT to specific individuals or entities or limiting the geographical scope of use. Governance and Upgrades: The smart contract may outline rules for governance and potential future upgrades of the NFT. This can include mechanisms for community voting, consensus changes, or the introduction of new features or functionalities. These are not intended to be exhaustive of possible licensing terms, and different automated rights contracts, NFT projects, and platforms may introduce their own unique licensing terms and conditions.

GUI 302 includes graphical user interface controls 340 and 345 for canceling the creation of the automated rights contract and proceeding with creation of the automated right contract, respectively. GUI 302 also provides estimate 350 of the cost to mint the NFT for the unique digital asset on blockchain 155. In this example, cost estimate 350 is given in denomination of the MATIC cryptocurrency and its corresponding current price in United States dollars. MATIC is a cryptocurrency that serves as the native token of the POLYGON network, which is a Layer 2 scaling solution built on top of the ETHEREUM blockchain designed to address the scalability limitations of some blockchain networks, such as ETHEREUM.

While in some embodiments blockchain 155 supports a layer-2 scaling solution for ETHEREUM such as the aforementioned POLYGON or PLASMA, OPTIMISM, or ARBITRUM, blockchain 115 supports a layer-2 scaling solution for BITCOIN such as the LIGHTNTING NETWORK in other embodiments.

Step 3, step 4, and step 5 of the example method may be performed by CMS 100 in response to Ava choosing to proceed with creation of automated rights contract. For example, step 3, step 4, and step 5 may be performed by CMS 100 after Ava has provided rights metadata 135 for the selected unique digital asset using GUI 302 and in response to Ava selecting graphical user interface controls 345.

At step 3 and step 4, NL contract generator 115 generates NL document contract 140 from rights metadata 135 stored in metadata store 110. NL contract generator 115 automates the process of creating a legally binding NL document contract 140 in human-readable language based on rights metadata 135 stored in metadata store 110. To do this, NL contactor generator 115 performs some or all of the following operations. Metadata Extraction: NL contactor generator 115 accesses metadata store 110, which contains structured data 135 describing the digital asset rights. NL contactor generator 115 extracts the relevant metadata fields associated with the contract, such as ownership details, permitted uses, restrictions, royalties, and any other relevant terms. Template Selection: NL contactor generator 115 selects an appropriate contract template based on the type of digital asset rights being addressed. The templates serve as pre-designed contract frameworks that can be customized with the extracted metadata 135. Data Mapping: NL contactor generator 115 maps the extracted metadata to the corresponding sections and variables within the selected contract template. This ensures that the generated contract reflects the specific terms and conditions associated with the digital asset rights. Contract Generation: Using the selected template and the mapped metadata, NL contactor generator 115 generates a draft contract in natural language. It populates the contract document with the relevant metadata, substituting placeholders and variables with actual values and descriptions. Language Customization: NL contactor generator 115 applies language customization rules to ensure that the generated contract adheres to legal and linguistic conventions specific to the jurisdiction and language of the contract. This may involve incorporating standard clauses, legal terminology, and language style appropriate for the intended audience. Review and Validation: The generated contract 140 is then presented by NL contactor generator 115 for review and validation by the executor (e.g., Ava in the example of FIG. 1) to ensure accuracy, compliance, and alignment with the intended purpose of the contract. Any necessary revisions or amendments may be made at this stage. Final Document Generation: Once the contract has been reviewed and approved, NL contactor generator 115 produces the final version of contract 140. NL contactor generator 115 can generate contract 140 in various formats, such as PDF, WORD, or other suitable electronic document format, ready for distribution, sharing, or digital signing. By automating the contract generation process, NL contactor generator 115 reduces manual effort, improves efficiency, and helps ensure consistency in contract creation.

At step 5, NL document contract 140 or a reference thereto is provided to electronic signature system 120 to obtain signatures on contract 140 by the contracting parties. The contracting parties can include the executor (e.g., Ava) and any creators or contributors specified in rights metadata 134 or contract 140 (e.g., Bjorn, Chloe, and Daiki). NL contactor generator 115 prepares document contract 140 in a format compatible with electronic signature system 120 such as by converting contract 140 into a standardized electronic document format, such as PDF, which is widely accepted for electronic signatures. NL contactor generator 115 integrates with electronic signature system 120 such as an application programming interface (API) or other suitable integration mechanism that allows for communication and data exchange between NL contactor generator 115 and electronic signature system 120. NL contractor generator 115 transfers contract 140 to electronic signature system 120 by uploading contract 140 to electronic signature system 120 or by providing a reference or link (e.g., a URI or URL) to a secure storage location of contract 140.

Figure 4:
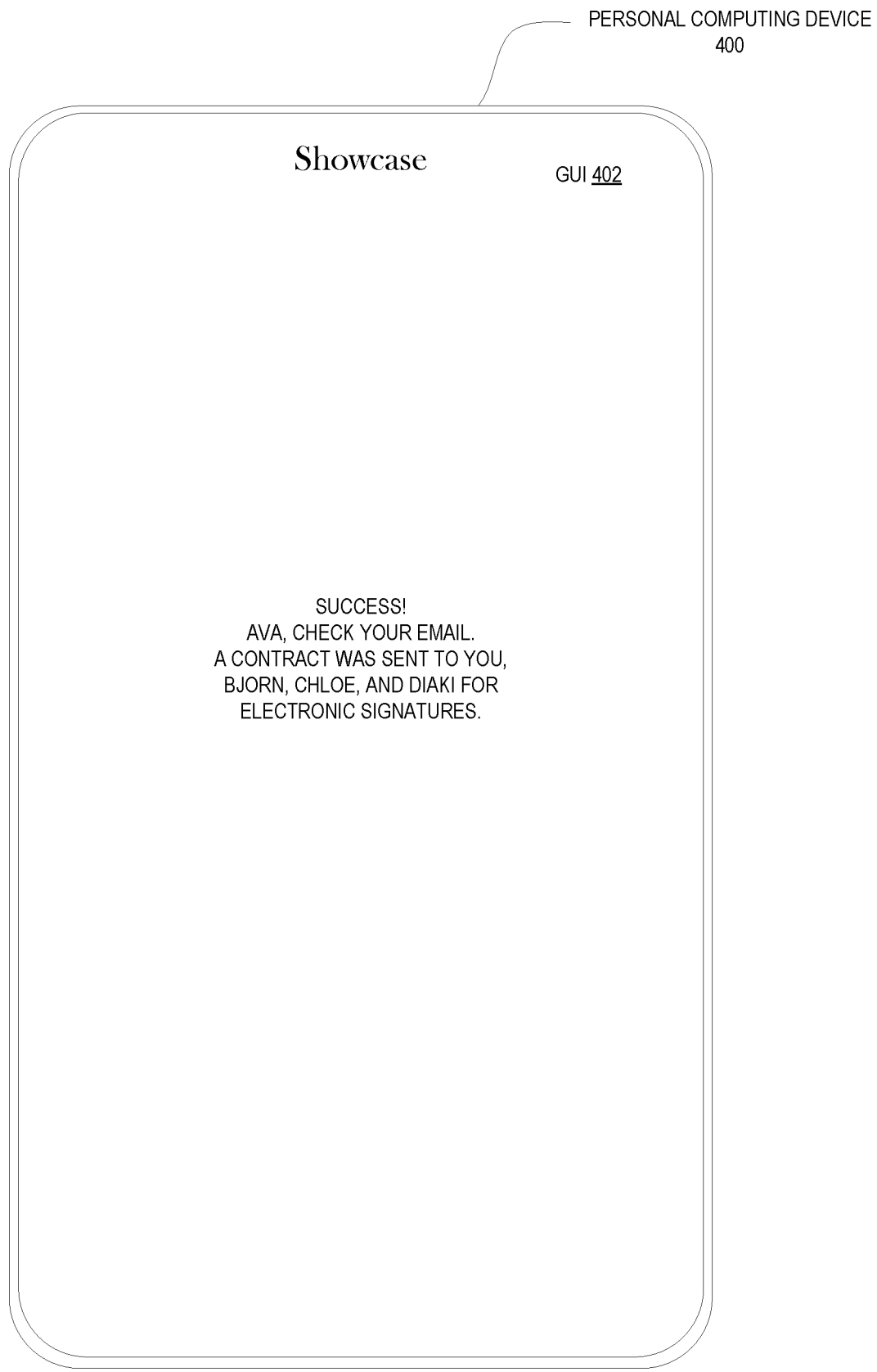
FIG. 4 depicts an example graphical user interface used to indicate that a natural language document contract was successfully created and successfully sent to an electronic signature system to obtain the electronic signatures of the contracting parties on the document contract, according to the disclosure's embodiments.

FIG. 4 depicts an example graphical user interface used to indicate that a natural language document contract was successfully created and successfully sent to an electronic signature system to obtain the electronic signatures of the contracting parties on the document contract, according to the disclosure's embodiments. Personal computing device 400, a smartphone with a touchscreen display, showcases GUI 402 on its video display. GUI 402 is displayed after steps 1-5 of the example method are successfully completed for the unique digital asset. The message presented in GUI 402 informs the executor (e.g., Ava) that natural language document contract 140 reflecting rights metadata 135 for unique digital asset 130 was successfully created and that document contract 140 has been sent to the contracting parties (e.g., Ava, Bjorn, Chloe, and Diaki) for their electronic signatures.

At step 6, electronic signature system 120 collects electronic signatures on NL document contract 140 from the parties to the automated rights contract (Ava, Bjorn, Chloe, and Daiki in the example of FIG. 1) to yield electronically signed NL document contract 145. Electronic signature system 120 facilitates the collection of electronic signatures on NL document contract 140. This may include electronic signature system 120 sending out invitations to the signatories (Ava, Bjorn, Chloe, and Daiki in the example of FIG. 1) to access and review contract 140. The signatories receive the invitation and follow the provided link to access electronic signature system 120. They are prompted to authenticate their identities using various methods, such as by username/password, entering a secure access code, verifying through email or SMS, or utilizing multi-factor authentication. Electronic signature system 120 presents NL document contract 140 to the signatories for review. The signatories can scroll through document 140, read its content, and understand the terms and conditions outlined in contract 140. Once the signatories have reviewed contract 140 and are ready to provide their electronic signatures, electronic signature system 120 presents options for placing signatures. This can include drawing signatures using a mouse or touchscreen, uploading pre-defined signature images, or using advanced cryptographic methods for secure digital signatures. The signatories place their electronic signatures in the designated signature fields or areas within document 140. Electronic signature system 120 captures and embeds the digital signatures securely into document 140, associating them with the corresponding signatory identities. Electronic signature system 120 records the timestamps of each signature placement to establish a chronological order of signing. It also maintains an audit trail that includes relevant information such as the IP addresses, timestamps, authentication methods used, and any other necessary details for future reference and legal validity. Once all signatories have placed their electronic signatures, electronic signature system 120 confirms the completion of the signing process. It may provide notifications or confirmation emails to the signatories and the executor (e.g., Ava) to acknowledge the successful collection of electronic signatures. Electronic signature system 120 generates final electronic signed NL document contract 145, which includes the embedded electronic signatures and relevant metadata. Document 145 is considered legally binding and can be downloaded or securely accessed by the signatories and the contract initiator. By leveraging electronic signature system 120, the process of collecting electronic signatures on NL document contract 140 becomes efficient, secure, and legally valid. System 120 streamlines the signing process, eliminates the need for physical signatures, and provides a digital record of signed contract 145 for easy storage, distribution, and future reference.

At step 7, electronically signed NL document contract 145 or a reference thereto is provided to smart contract generation system 125. Once the contracting parties have signed the NL document contract 140 using electronic signature system 120, system 120 verifies and confirms the validity and integrity of the electronic signatures. It ensures that the signatures are legally binding and compliant with relevant electronic signature regulations. Electronics signature system 120 extracts electronically signed NL document contract 145 from its repository. This can be in the form of a digitally signed PDF or a secure document file that includes embedded signatures. Electronic signature system 120 integrates with smart contract generation system 125, either through an application programming interface (API) or another integration method. This allows for the transfer of electronically signed document 145 or relevant contract information to smart contract generation system 125. Electronic signature system 129 transmits the electronically signed NL document contract 145 or a reference to smart contract generation system 125. This transfer can be accomplished through secure file sharing, data exchange protocols, or other established communication methods.

At step 8, smart contract generation system 125 generates smart contract 150 that includes self-executing code and an immutable reference to electronically signed NL document contract 145. System 125 receives the relevant data from electronically signed natural language document contract 145 or a reference thereto provided by electronic signature system 120. Additionally, or alternatively, system 125 receives the relevant data from rights metadata 135 stored from metadata store 110. The relevant data may include the key contractual terms, the contracting parties' identities, and any other suitable details. Smart contract generation system 125 selects an appropriate smart contract template or creates a custom template based on the requirements and specifications of contract 145. The template provides a pre-defined structure for the smart contract code. System 125 maps the extracted data from electronically signed natural language document contract 145 or rights metadata 135 to the corresponding fields and variables within the selected smart contract template. This ensures that the smart contract includes the agreed-upon terms and conditions. Smart contract generation system 125 incorporates self-executing code into the selected template. This code defines the automated behavior of smart contract 150, specifying how it will execute its functions, process transactions, and enforce the agreed-upon rules and conditions. System 125 includes an immutable reference to electronically signed natural language document contract 145 within smart contract 150. This reference can be a cryptographic hash or another mechanism that ensures the integrity and authenticity of the referenced document 145. Smart contract generation system 125 compiles the generated code, ensuring its compatibility with targeted blockchain 155.

At step 9, smart contract 150 with the self-executing code and the immutable reference is deployed to blockchain 155 which can simultaneously or thereafter be used to mint the NFT for unique digital asset 130. The generated smart contract 150 is deployed onto designated blockchain 155. This process involves smart contract generator 125 interacting with the platform 155's APIs or using a dedicated deployment tool. Once deployed, smart contract 150 becomes operational and ready for execution. Users or parties involved in smart contract 150 can interact with smart contract 150 on blockchain 155 by sending transactions to it. The self-executing code within smart contract 150 automatically enforces the specified conditions and executes predefined functions based on the predefined rules and triggers. Any party involved in smart contract 150 can verify the integrity and authenticity of electronically signed NL document contract 145 by cross-referencing the immutable reference stored within smart contract 150. This allows stakeholders (e.g., Ava, Bjorn, Chloe, and Diaki) to ensure that the terms agreed upon in signed document 145 align with the behavior of smart contract 150.

Figure 5:
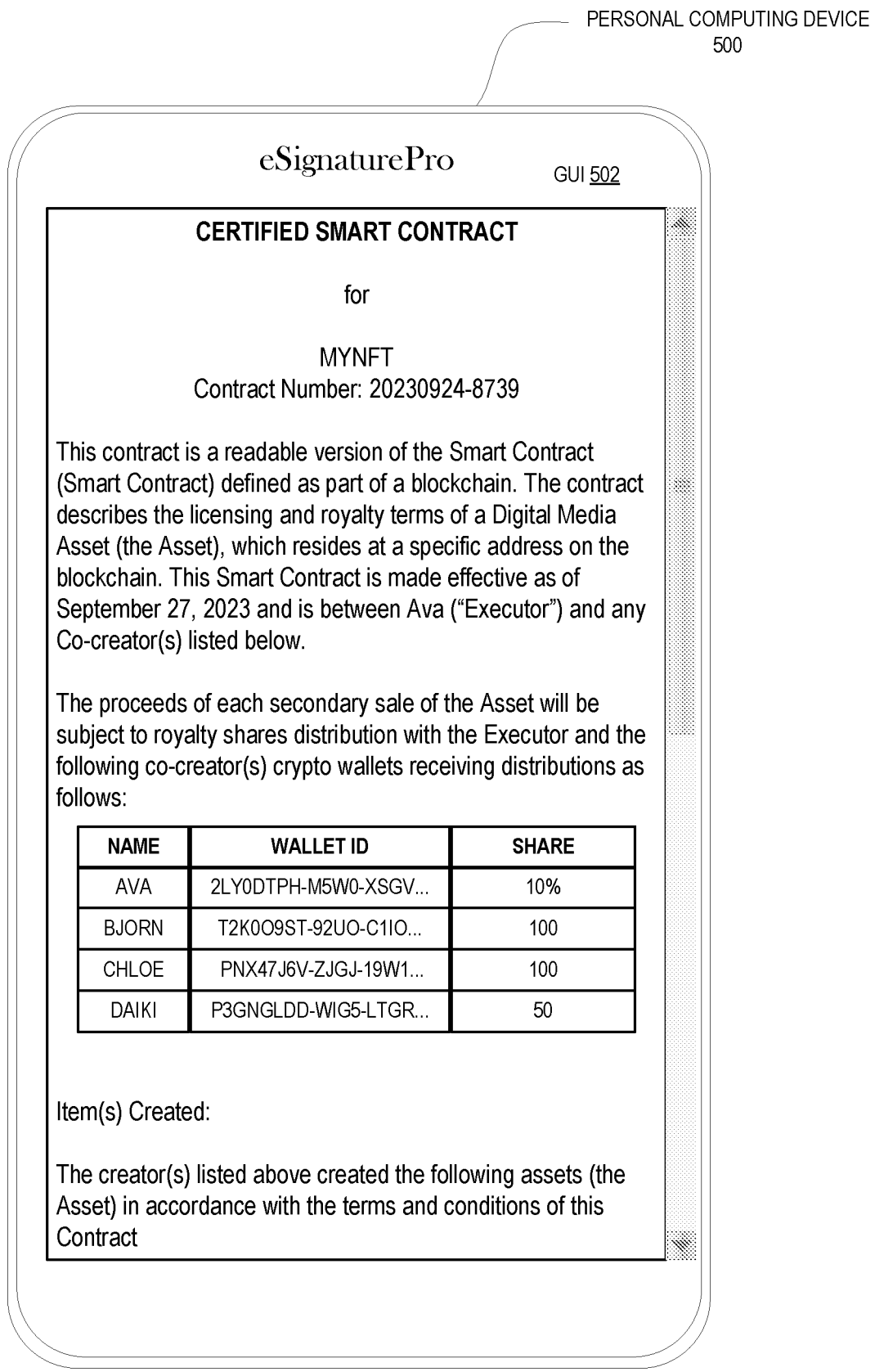
FIG. 5 and FIG. 6 illustrate an example natural language document contract, according to some embodiments of the disclosure.
Figure 6:
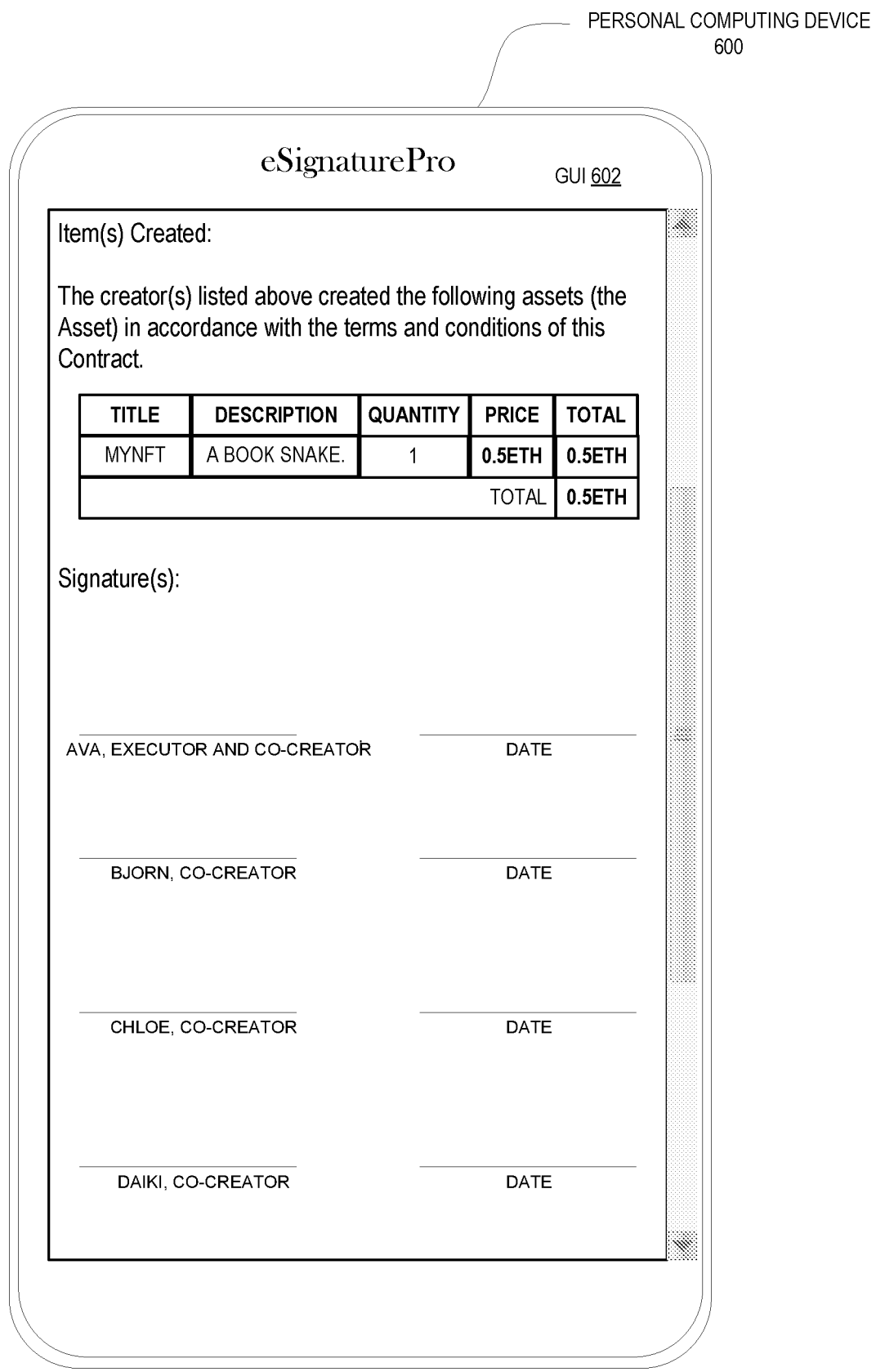

FIG. 5 and FIG. 6 illustrate an example natural language document contract, according to some embodiments of the disclosure. Personal computing device 500, a smartphone with a touchscreen display, displays GUI 502 on its video display. GUI 502 is displayed by electronic signature system 120 to obtain an electronic signature from one of the contracting parties (e.g., Ava, Bjorn, Chloe, or Diaki). GUI 502 displays a first part of NL document contract 140 as generated by NL contract generator 115 from rights metadata 135 in the example of FIG. 1. Personal computing device 600, a smartphone with a touchscreen display, displays GUI 602 on its video display. GUI 602 is displayed by electronic signature system 120 to obtain an electronic signature from one of the contracting parties (e.g., Ava, Bjorn, Chloe, or Diaki). GUI 602 displays a second part of NL document contract 140 as generated by NL contract generator 115 from rights metadata 135 in the example of FIG. 1.

Figure 7:
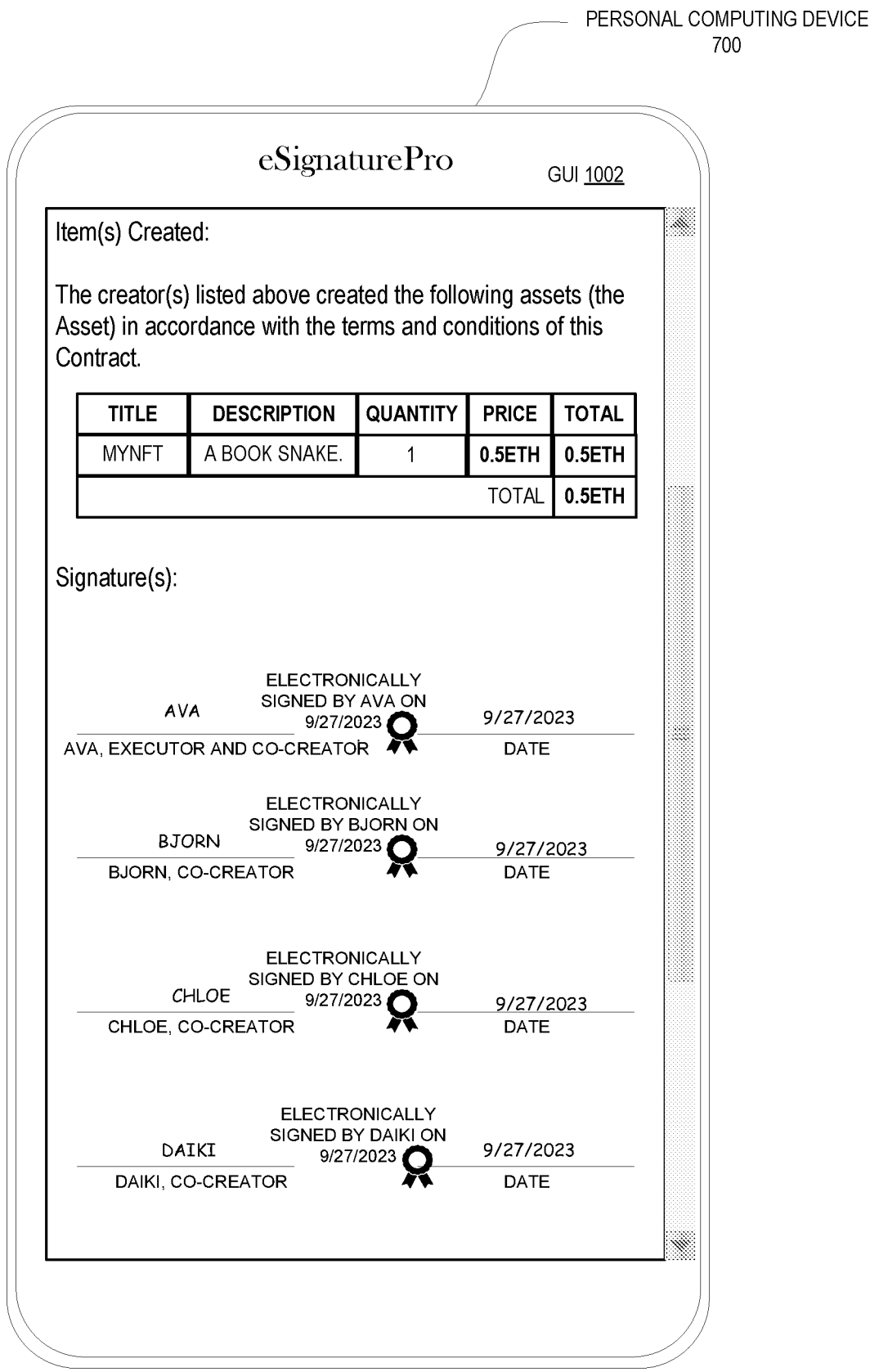
FIG. 7 illustrates an example electronically signed natural language document contract, according to some embodiments of the disclosure.

FIG. 7 illustrates an example electronically signed natural language document contract, according to some embodiments of the disclosure. Personal computing device 700, a smartphone with a touchscreen display, displays GUI 702 on its video display. GUI 702 is displayed by electronic signature system 120 after electronic signatures have been obtained by electronic signature system 120 from all the contracting parties (e.g., Ava, Bjorn, Chloe, and Diaki). GUI 702 displays the second part of electronically signed NL document contract 145 corresponding to the second part of NL document contract 140 as depicted in FIG. 6 and in the context of the example of FIG. 1.

Figure 8:
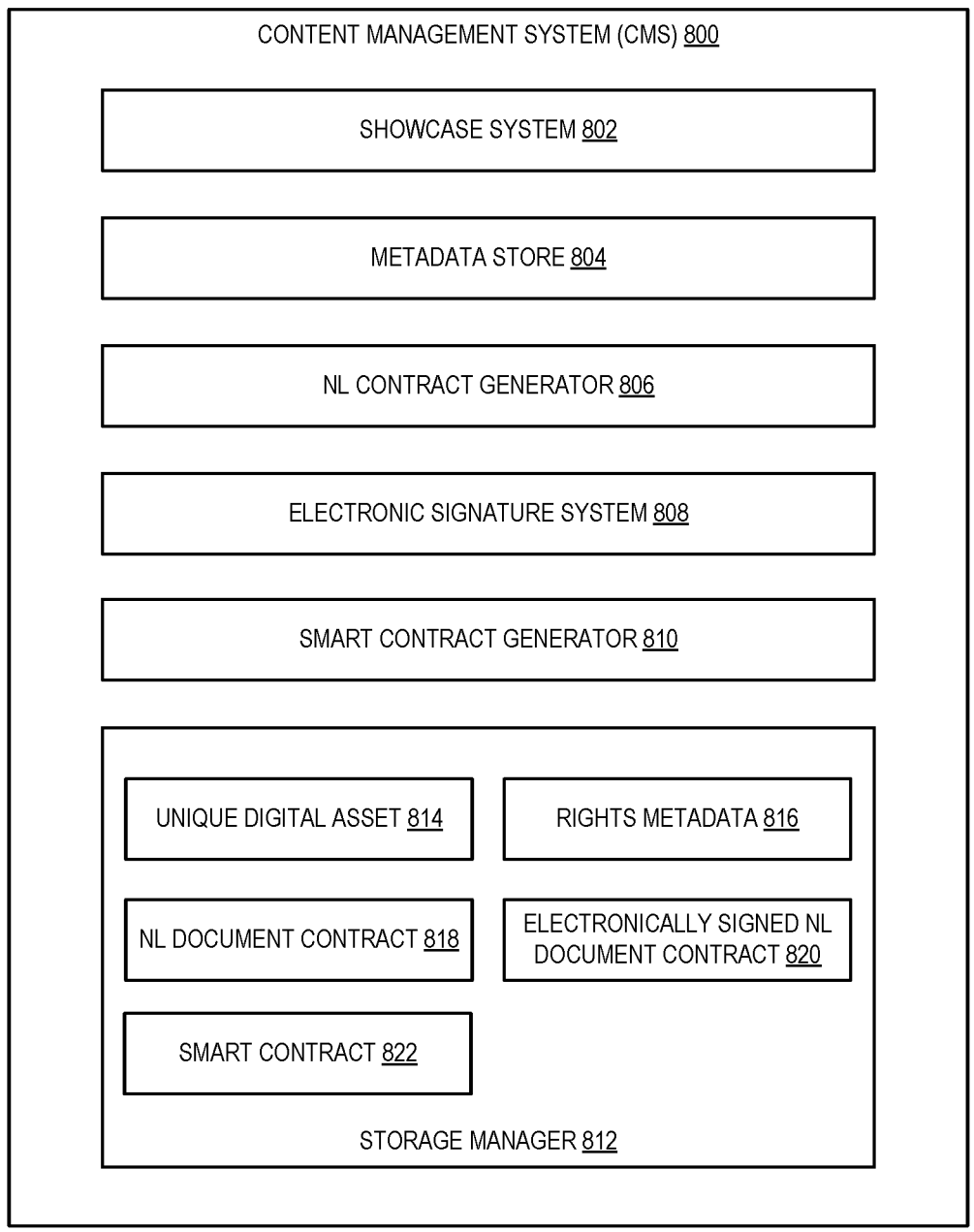
FIG. 8 illustrates a schematic diagram of a content management system in accordance with one or more embodiments.

FIG. 8 illustrates a schematic diagram of content management system 800 for non-fungible token creation workflow with automated rights management, in accordance with one or more embodiments. As shown, system 800 may include, but is not limited to, showcase system 802, metadata store 804, natural language (NL) contractor generator 806, electronic signature system 808, and smart contract generator 810.

System 800 includes showcase system 802, a specialized online platform for creative professionals to display their digital portfolios and projects, functioning as a social media platform catered to artists, designers, photographers, illustrators, and other creative individuals. Showcase system 802 offers users a personalized space to create profiles and present their digital works through project pages, allowing for the uploading of diverse digital media types such as images and videos to visually showcase their creative projects. In showcase system 802, users can enrich their digital works by including project descriptions, details, and tags, fostering a dynamic and interactive environment that enhances the discoverability and promotes effective sharing of creative endeavors among other users. Showcase system 802 offers a range of features, including project appreciation, following and networking, collections, and collaboration, that collectively enhance the creative community experience by providing opportunities for recognition, connection, organization, and collaboration among users, fostering an enriching and interactive environment.

Metadata store 804 is a dedicated storage system designed for storing rights metadata, utilizing a robust database management system (DBMS) capable of efficiently handling structured data and facilitating effective querying and retrieval processes. Metadata store 804 can be implemented using diverse database systems such as relational, NoSQL, graph databases, or centralized network file systems, providing flexibility in data storage and management to cater to the specific needs. Metadata store 804 can also utilize decentralized storage systems such as blockchain technology or content address storage systems like IPFS, SWARM, and others, offering secure and tamper-resistant mechanisms for storing rights metadata in a distributed manner. The implementation of metadata store 804 is selected based on factors such as scalability, security, interoperability, and desired characteristics, ensuring effective storage and retrieval of rights metadata within the system. Metadata store 804 ensures attribution and accountability by maintaining a history of changes, provides robust access control mechanisms to authenticated and authorized users, employs cryptographic encryption techniques for confidentiality and integrity, creating a secure environment for storing and managing rights metadata with transparency and protection against unauthorized access.

NL contract generator 806 is a computer system that generates a natural language document contract based on metadata that describes the rights associated with a specific digital asset. Rights metadata stored in metadata store 806 for a unique digital asset can encompass various rights, including ownership, usage, royalty, access, attribution, and expiry rights, which can be enforced by a smart contract generated based on the rights metadata, providing a flexible and automated framework for managing and enforcing contractual terms and conditions for the digital asset. NL contract generator 806 may include a metadata extraction sub-process or sub-module that retrieves pertinent rights metadata from metadata store 804, capturing ownership details, usage rights, licensing terms, royalties, and other relevant information associated with the unique digital asset, ensuring accurate representation of the rights in the generated NL document contract. NL contract generator 806 may incorporate a data mapping sub-process or sub-module that aligns the extracted rights metadata with specific sections or elements of a contract template, ensuring a seamless integration of the relevant information into the natural language document contract, resulting in a comprehensive and accurate representation of the rights and associated terms. NL contract generator 806 may include a natural language contract template selection sub-process or sub-module that chooses a suitable contract template from a library based on user input or other relevant criteria, ensuring the selected template aligns with the specific rights and requirements of the unique digital asset, streamlining the NL document contract creation process for more efficient and accurate results. NL contract generator 806 may incorporate a variable insertion sub-process or sub-module that seamlessly integrates the mapped rights metadata into the contract template, populating predefined variables or placeholders with the specific details from the rights metadata, streamlining the contract generation process and producing a comprehensive and customized NL document contract that accurately reflects the terms and conditions associated with the unique digital asset. NL contract generator 806 populates the template with extracted metadata to ensure the generated NL document contract accurately represents the specific details and associated rights of the unique digital asset, utilizing a natural language generation sub-process that employs rule-based, machine learning-based, or generative AI-based techniques to generate coherent and understandable human-readable text in a natural language format based on the populated contract template and rights metadata. NL contract generator 806 utilizes a natural language generation sub-process to transform the populated contract template and rights metadata into a final NL document contract, generating fluent and comprehensible text through rule-based systems, machine learning algorithms, or generative AI models, ensuring transparency, readability, and accessibility of the contractual terms and obligations associated with the unique digital asset in a user-friendly natural language format.

Electronic signature system 808 is an online platform that automates the electronic signing process and offers secure, verifiable, and legally binding electronic signatures in compliance with various electronic signature standards and regulations, enabling users to sign documents using their end-user computing devices through methods such as mouse, touchpad, touchscreen, stylus, or image upload, ensuring a secure and reliable solution for executing electronic signatures within the CMS 800 environment. Electronic signature system 808 is accessible and usable across various end-user computing devices and platforms, including web browsers, mobile computing devices, and tablet computers, allowing users to conveniently sign and send documents from anywhere using either a dedicated mobile application or a web-based application, providing a user-friendly and flexible signing experience that supports mobility and accommodates different device preferences. Electronic signature system 808 offers real-time or near real-time tracking and visibility into the status of documents, allowing users to monitor the signing process, track document recipients, and view detailed audit trails that record key information such as access, views, and signatures, ensuring transparency, accountability, and compliance with regulations while facilitating efficient document management and follow-up. Electronic signature system 808 prioritizes document integrity and user data protection through encryption, authentication, and advanced security controls, ensuring confidentiality and integrity, while also complying with industry standards and regulations such as eIDAS, UETA, PAGES, XAdES, CAdES or the like to validate the legality and validity of electronic signatures, providing users with a secure and trusted environment for executing electronic signatures.

Smart contract generator 810 is a computer system that generates a smart contract for a unique digital asset, incorporating self-executing code written in a programming language like MOVE, SOLIDITY, VYPER, CADENCE, RUST, PLUTUS, or other suitable smart contract languages, enabling autonomous execution on a blockchain, eliminating intermediaries, ensuring reliable and immutable contract execution, and enhancing efficiency and transparency in the automated rights contract process.

The generated smart contract adheres to predefined standards, such as ERC-721, ERC-1155, TRC-721, BEP-721, BEP-1155, or other suitable standards for non-fungible tokens (NFTs), promoting interoperability, compatibility, and consistency among different smart contracts deployed on a blockchain, enabling seamless integration and interaction with decentralized applications and platforms within the blockchain ecosystem, thus fostering a vibrant and interconnected ecosystem for unique digital assets. While the generated smart contract may adhere to a standard for NFTs on a blockchain, it can also be in a proprietary format specific to certain blockchain platforms or ecosystems, such as CRYPTOKITTIES, DECENTRALAND, NBA TOP SHOT, AXIE INFINITY, or other similar projects, providing customized structure and behavior tailored to the unique requirements and functionalities of those platforms or applications, ensuring compatibility and seamless integration with the corresponding project or application.

In certain cases, smart contract generator 810 generates the smart contract of an automated rights contract by utilizing the rights metadata from metadata store 804, employing a smart contract compiler that converts the structured data format of the rights metadata (such as JSON or XML) into a compatible format for execution on a blockchain. The smart contract compiler performs lexical analysis, syntactic analysis, semantic analysis, intermediate code generation, optimization, target code generation, and other relevant compilation processes to convert the rights metadata into individual tokens and prepare it for execution on the blockchain. During syntactic analysis (parsing), the smart contract compiler verifies that the arrangement and structure of the rights metadata tokens comply with the grammar rules specific to the rights metadata, ensuring correct syntax, while semantic analysis examines the meaning and context of the rights metadata. After ensuring the syntactic and semantic accuracy of the rights metadata, the smart contract compiler generates intermediate code representations, like an abstract syntax tree (AST), to capture the structure and relationships within the metadata, and performs additional analysis and optimization to improve efficiency, performance, and resource usage in the resulting self-executing code of the smart contract. The smart contract compiler generates target self-executing code, such as executable code, bytecode, or machine code, tailored to the supported blockchain platform of a blockchain, enabling the deployment and execution of the smart contract on the specific blockchain. Smart contract generator 810 utilizes the smart contract compiler to effectively transform rights metadata into a compatible and executable smart contract on a blockchain, enabling the automated execution of the specified rights and behaviors defined within the contract.

After the smart contract is generated by smart contract generator 810, it can be deployed to a blockchain, which is equipped with a virtual machine, like the Ethereum Virtual Machine (EVM) or the Binance Smart Chain Virtual Machine (BVM), capable of interpreting and executing the compiled self-executing code of the smart contract. After deployment to a blockchain, the smart contract can instantly execute its intended functions, which encompass NFT minting, ownership transfer, royalty sharing, access control, time-limited usage enforcement, metadata storage, integration with NFT marketplaces or applications, and other pertinent smart contract functionalities, including an immutable reference to the electronically signed NL document contract for the unique digital asset. The self-executing code within the deployed smart contract guarantees the automated and trustworthy execution of the intended functions, enabling the smart contract to operate autonomously in a decentralized and trustless manner, without the requirement of intermediaries or manual intervention. The deployment of the smart contract to a blockchain harnesses the capabilities of blockchain technology, empowering the system to facilitate and enforce a wide range of functionalities related to NFTs, including their creation, ownership, transfer, and management of associated rights, thereby enhancing the overall NFT ecosystem.

In addition to using a smart contract compiler, smart contract generator 810 utilizes a large language model (LLM) like GPT2, GPT3, T5, Turing-NLG, or similar models to generate the smart contract based on the NL document contract generated by NL document generator 806 for the unique digital asset. To achieve this, a pre-trained LLM is utilized, which may have undergone fine-tuning using techniques such as prompting or few-shot learning, involving the utilization of pairs of natural language contractual clauses and corresponding segments of self-executing code from smart contracts in a low resource manner. The pre-trained LLM can be trained on a smaller corpus of NL document contract clauses and self-executing smart contract code segments, providing sufficient information for the LLM to generate suitable smart contract code segments based on the NL document contract clauses, despite the smaller training corpus compared to the original LLM training data.

By utilizing the capabilities of the pre-trained LLM, smart contract generator 810 can generate the smart contract by leveraging natural language processing and generation techniques. This approach offers flexibility and adaptability in generating the self-executing code based on the NL document contract, providing an alternative method for creating the smart contract for the unique digital asset. Smart contract generator 810 utilizes the pre-trained LLM's natural language processing and generation capabilities to flexibly and adaptively generate the smart contract, offering an alternative method for creating the self-executing code based on the NL document contract, thereby providing flexibility and adaptability in the smart contract generation process for the unique digital asset.

During inference, smart contract generator 810 preprocesses the natural language document contract by removing irrelevant sections, standardizing terminology, and extracting essential clauses and conditions related to the digital asset's rights, preparing it for input into the trained LLM. Smart contract generator 810 employs the trained LLM or other text-to-code generation techniques to generate self-executing code, code snippets, or complete code structures that implement the rights, clauses, or conditions specified in the NL document contract produced by NL contract generator 806 for the unique digital asset. After the generation process, smart contract generator 810 performs post-processing steps to refine and validate the generated self-executing smart contract code, encompassing syntax verification, ambiguity resolution, compliance with programming language and blockchain requirements, and accuracy checks to ensure faithful representation of the rights, clauses, and conditions stated in the NL document contract. Furthermore, smart contract generator 810 performs comprehensive testing on the generated self-executing code to verify its functionality, ensuring adherence to the intended rights and the requirements of the target blockchain, guaranteeing that the code functions as expected and aligns with the specified rights and conditions. Upon completion of the testing phase, smart contract generator 810 deploys the generated smart contract onto a blockchain, enabling its execution and automated enforcement of the specified rights within the digital asset, ensuring efficient and reliable enforcement of the intended rights through the generated self-executing code.

Smart contract generator 810 generates the smart contract, incorporating an immutable reference to the electronically signed NL document contract for the unique digital asset, usually included in a designated metadata section within the smart contract. The reference within the smart contract, in the form of a URI, URL, or network address, directs to the location of the electronically signed NL document contract, which may be hosted by electronic signature system 808 or elsewhere, and may include additional information like cryptographic hashes to ensure document integrity when accessed through the reference.

The location of the electronically signed NL document contract referred to by the reference can be at an off-chain address such as at electronic signature system 808. The off-chain address can be an address or identifier of a location where electronically signed NL document contract is stored where such location is not on or is outside the blockchain where the smart contract that refers to the document contract is stored.

Through the utilization of the reference, authorized and authenticated users can access the natural language representation of the electronically signed NL document contract using a suitable software application, such as a web browser or mobile application, enabling them to comprehend and interpret the expressed rights within the unique digital asset in a human-readable and natural language format. Moreover, the reference enables the identification of the signatories who have endorsed the contract with their electronic signatures, allowing authenticated and authorized users to access this information and determine the individuals who have officially signed the contract. The inclusion of an immutable reference within the smart contract promotes transparency and accessibility, allowing authenticated and authorized users to access the electronically signed NL document contract in a natural language format, thereby enhancing comprehension and clarity regarding the rights associated with the unique digital asset.

The reference to the electronically signed NL document contract within the smart contract remains immutable after deployment on a blockchain, as it becomes an integral and permanent part of the tamper-evident transaction history inherent to the blockchain. The decentralized nature of the blockchain guarantees that the deployed smart contract remains resistant to unauthorized modifications, thanks to cryptographic hashes and Merkle trees, which ensure data integrity and immutability on the blockchain. Altering the reference to the electronically signed NL document contract or any part of the deployed smart contract on the blockchain would require modifying the entire transaction history, which is practically infeasible due to the distributed nature of the blockchain, and the computational effort involved. The unalterable reference to the electronically signed NL document contract within the smart contract on the blockchain ensures the integrity and reliability of contractual information associated with the unique digital asset, strengthening the trust, security, and immutability of the automated rights contract system.

As illustrated in FIG. 8, CMS 800 also includes storage manager 812. The storage manager 812 maintains data for CMS 800. The storage manager 810 can maintain data of any type, size, or kind as necessary to perform the functions of CMS 800. The storage manager 812, as shown in FIG. 8, includes unique digital asset 814, rights metadata 816, NL document contract 818, electronically signed NL document contract 820, and smart contract 822. It should be noted that storage manager 810 can maintain and store multiple sets of these data items for multiple unique digital assets for one or more users of CMS 800.

Unique digital asset 814 represents any digital asset that can be minted as a non-fungible token (NFT). For example, unique digital asset 814 could be a digital artwork or other creative digital work created by a digital artist. For example, this digital artwork could be in the form of a high-resolution image file, capturing the artist's unique style, creativity, and expression. The artwork may possess distinct characteristics, such as intricate details, vibrant colors, and a thought-provoking concept, making it a one-of-a-kind piece in the digital realm. Unique digital asset 814 can one various types of digital assets including any of: digital art, digital collectible, virtual real estate, domain name, virtual avatar, digital music, digital audio, virtual good, virtual skin, virtual ticket, digital memorabilia, virtual landscape or environment, or any other suitable unique digital asset that can be minted as an NFT.

Rights metadata 816 can include various permissions, ownership details, and conditions associated with an NFT for unique digital asset 814. Some examples include any or all of: ownership rights, transfer rights, usage rights, royalty rights, access rights, attribution rights, expiry or time-based rights, or any other suitable rights.

Natural language (NL) document contract 818 is an electronic document contract (e.g., PDF document) expressing rights metadata 816 in a natural language form and according to a NL document contract template. NL document contract 818 can express various permission, ownership details, and conditions associated with the NFT for unique digital asset 818. Some examples include any or all of: ownership rights, transfer rights, usage rights, royalty rights, access rights, attribution rights, expiry or time-based rights, or any other suitable rights.

Electronic signed natural language (NL) document contract 820 corresponds to NL document contract 818 but electronically signed by one or more contracting parties to the document contract. The parties may include any or all of: the executor of the automated rights contract, a party receiving a royalty amount or share, an owner or co-owner of unique digital asset 814 or the NFT, a creator or co-creator of unique digital asset 814, or any other suitable contracting party.

Smart contract 822 encompasses a self-executing computer program that automatically enforces, verifies, and executes the terms and conditions of the electronically signed NL document contract 820. Smart contract 822 may be deployed to a blockchain platform and operates based on predefined rules and logic encoded within contract 822. In addition to self-executing code, smart contract 822 may include an immutable reference to electronic singed NL document contract 820 along with one or more cryptograph hash for verifying the integrity of electronically singed NL document contract 820 at the reference location.

Each of the components 802-810 of CMS 800 and their corresponding elements (as shown in FIG. 8) may be in communication with one another using any suitable communication technologies. It will be recognized that although components 802-810 and their corresponding elements are shown to be separate in FIG. 8, any of components 802-810 and their corresponding elements may be combined into fewer components, such as into a single facility or module, divided into more components, or configured into different components as may serve a particular embodiment.

The components 802-810 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of CMS 800 can cause a client device and/or a server device to perform the methods described herein. Alternatively, the components 802-810 and their corresponding elements can comprise hardware, such as a special purpose processing device to perform a certain function or group of functions. Additionally, the components 802-810 and their corresponding elements can comprise a combination of computer-executable instructions and hardware.

Furthermore, the components 802-810 of CMS 800 may, for example, be implemented as one or more stand-alone applications, as one or more modules of an application, as one or more plug-ins, as one or more library functions or functions that may be called by other applications, and/or as a cloud-computing model. Thus, the components 802-810 of CMS 800 may be implemented as a stand-alone application, such as a desktop or mobile application. Furthermore, the components 802-810 of CMS 800 may be implemented as one or more web-based applications hosted on a remote server. Alternatively, or additionally, the components of CMS 800 may be implemented in a suite of mobile device applications or "apps."

As shown, CMS 800 can be implemented as a single system. In other embodiments, CMS 800 can be implemented in whole, or in part, across multiple systems. For example, one or more functions of CMS 800 can be performed by one or more servers, and one or more functions of CMS 800 can be performed by one or more client devices. The one or more servers and/or one or more client devices may generate, store, receive, and transmit any type of data used by CMS 800, as described herein.

In one implementation, the one or more client devices can include or implement at least a portion of CMS 800. In other implementations, the one or more servers can include or implement at least a portion of CMS 800. For instance, CMS 800 can include an application running on the one or more servers or a portion of CMS 800 can be downloaded from the one or more servers. Additionally or alternatively, CMS 800 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 10. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 10.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 10.

Figure 9:
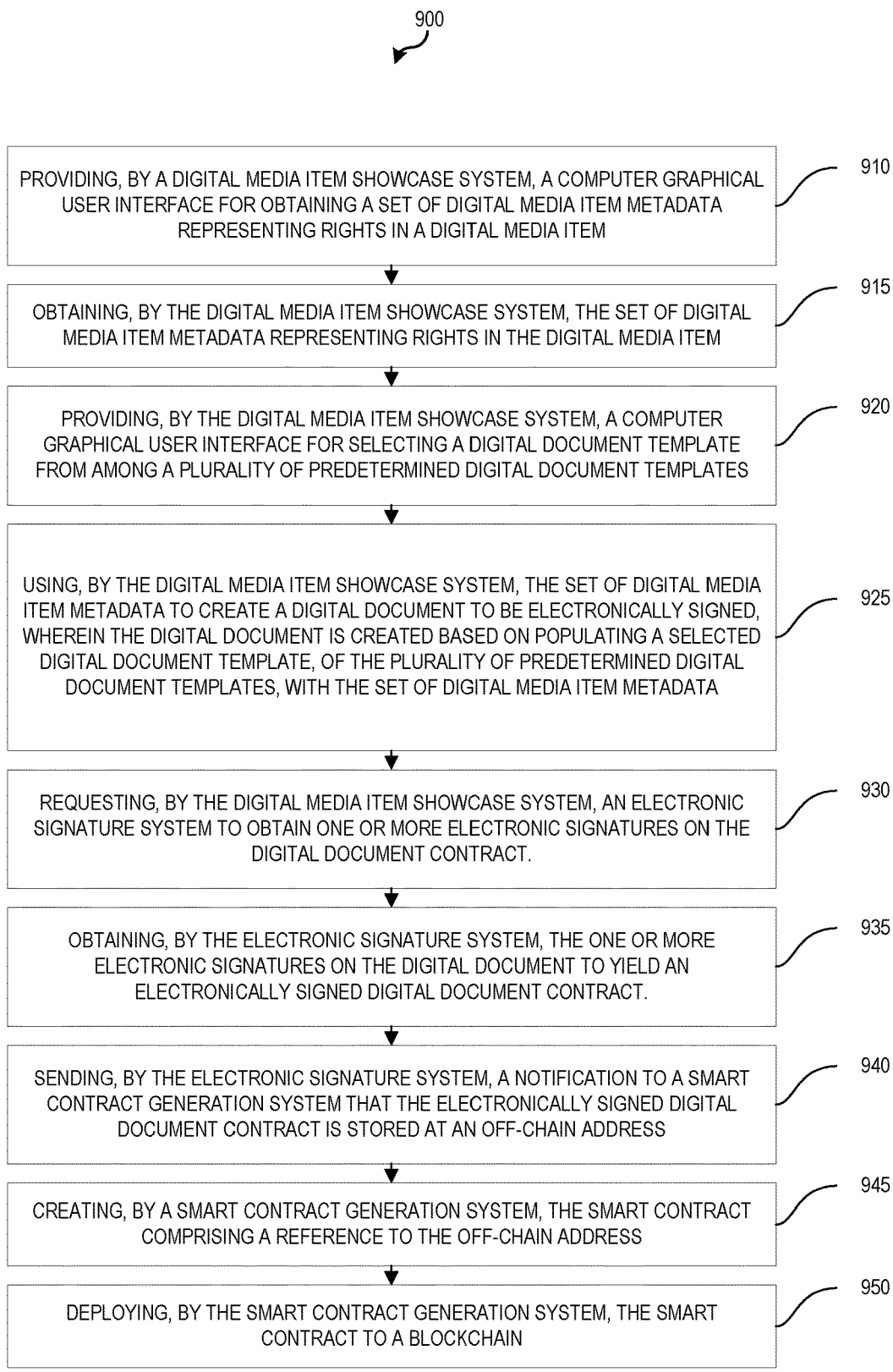
FIG. 9 illustrates a flowchart of a series of acts in a method for non-fungible token (NFT) creation workflow with automated rights management, in accordance with one or more embodiments.

FIG. 9 illustrates a flowchart 900 of a series of acts in a method for non-fungible token creation workflow with automated rights management, in accordance with one or more embodiments. In one or more embodiments, the method 900 is performed in a digital medium environment that includes CMS 800. The method 900 is intended to be illustrative of one or more methods in accordance with the present disclosure and is not intended to limit potential embodiments. Alternative embodiments can include additional, fewer, or different steps than those articulated in FIG. 9.

At step 910, showcase system 802 provides a computer graphical user interface for obtaining a set of digital media item metadata representing rights in a digital media item. Showcase system 802 can provide a computer graphical user interface (GUI) that enables users to interact with the system and obtain the set of digital media item metadata representing rights in the digital media item. The GUI can present a user-friendly interface where users can input relevant information or select options to specify the rights associated with the digital media item. This may include details such as ownership rights, usage rights, licensing terms, attribution requirements, access control, and any other rights relevant to the digital media item. The GUI can include input fields, dropdown menus, checkboxes, or other interactive elements to capture the desired rights metadata. Users can input or select the appropriate values and options to accurately represent the rights they wish to associate with the digital media item. The GUI can provide validation checks to ensure the entered information is correct and complete. Once the user provides the necessary information, showcase system 802 processes the input and generates the corresponding digital media item metadata representing the rights. This metadata can be stored and associated with the digital media item, allowing for easy management, retrieval, and sharing of the rights information within showcase system 802.

At step 915, showcase system 802 obtains the set of digital media item metadata representing rights in the digital media item. Showcase system 802 can provide a user interface where users can input or specify the rights associated with the digital media item. This can be done through input fields, checkboxes, dropdown menus, or other interactive elements. Users can provide information such as ownership rights, usage rights, licensing terms, attribution requirements, access control, and other relevant rights details. Showcase system 802 can extract rights metadata from the digital media item itself or from external sources. Additionally, showcase system 802 may employ techniques like image recognition or audio analysis to extract additional metadata relevant to rights in the digital media item. Showcase system 802 can utilize automated algorithms or machine learning techniques to analyze the digital media item and extract metadata related to its rights. For example, it can analyze the content of the media item to identify copyrighted materials or sensitive information that may require specific usage restrictions. Showcase system 802 may integrate with external databases or APIs to retrieve additional metadata representing rights associated with the digital media item. This can include information about copyright registrations, licensing agreements, royalty shares, or other legal and contractual aspects of the rights. Showcase system 802 may provide validation mechanisms to ensure that the entered or extracted metadata is accurate and complete. It can perform checks to validate the ownership status, confirm the rights holder's identity, or verify the compliance of the rights metadata with relevant regulations or standards. Once obtained, showcase system 802 stores the digital media item metadata representing the rights in a structured format (e.g., as rights metadata 816 in metadata store 804.) This metadata can be associated with the digital media item, enabling easy retrieval and management within showcase system 802. By using user input, automated analysis, integration with external sources, or validation mechanisms, showcase system 802 can obtain a comprehensive set of metadata representing the rights in the digital media item. This allows for efficient rights management, accurate representation of the rights, and enhanced user experience within showcase system 802.

At step 920, showcase system 802 provides a computer graphical user interface for selecting a digital document contract template from among a plurality of predetermined digital document contract templates. Showcase system 802 maintains a library or repository of predetermined digital document contract templates. These templates represent various contractual arrangements and terms that can be associated with the digital media item. The templates can cover licensing, usage rights, attribution requirements, ownership details, and other relevant contract clauses. Showcase system 802 presents a graphical user interface (GUI) to users, allowing them to browse and select a digital document contract template. The GUI can include features such as a template gallery, search functionality, or categorized options to help users find the most suitable template for their specific requirements. Showcase system 802 provides a preview of each template, allowing users to review the contents and structure of the contract before making a selection. This can include displaying sample clauses, sections, or placeholder text to give users an overview of the template's content. Showcase system 802 allows users to choose a template by selecting it from the available options within the GUI. This can be done by clicking on the template or using interactive elements such as checkboxes or radio buttons. The selection triggers the next steps in the process. After selecting a template, showcase system 802 can present customization options to users. This allows them to tailor the chosen template to their specific needs. Customization options may include filling in fields or providing additional information relevant to the contract terms, such as party details, pricing, or specific usage restrictions. Once users have customized the template to their satisfaction, showcase system 802 enables them to review the finalized document contract before confirming their selection. Users can scroll through the contract, verify the entered information, and make any necessary adjustments. Once confirmed, showcase system 802 integrates the selected template and the user's customizations. It combines the template structure and clauses with the specific details provided by the user to generate a complete digital document contract tailored to the digital media item and its associated rights. By providing a user-friendly graphical interface for template selection, customization options, and review, showcase system 802 empowers users to choose the most appropriate digital document contract template for their specific requirements. This enhances the efficiency and accuracy of contract creation and streamlines the management of contractual agreements.

At step 925, showcase system 802 uses the set of digital media item metadata to create a digital document contract to be electronically signed. The digital document contract is created based on populating a selected digital document contract template with the set of digital media item metadata. Showcase system 802 retrieves the set of digital media item metadata representing the rights and details associated with the digital media item. This metadata can include information such as ownership, licensing terms, attribution requirements, usage rights, and any other relevant contractual details. Showcase system 802 allows the user to select a digital document contract template from a predetermined set of templates. The selected template serves as the foundation for the digital document contract creation process. Using the set of digital media item metadata, showcase system 802 populates the selected digital document contract template with the corresponding information. The metadata is inserted into the appropriate sections or placeholders within the template to create a comprehensive and customized digital document contract. Showcase system 802 validates the populated digital document contract to ensure accuracy, consistency, and compliance with any legal or regulatory requirements. It checks for any missing or conflicting information and prompts the user to provide any necessary clarifications or corrections. Showcase system 802 provides a preview of the populated digital document contract to the user, allowing them to review the final version before proceeding to the signing stage. The preview enables the user to ensure that the populated metadata accurately reflects the rights and terms associated with the digital media item. Once the user is satisfied with the preview, showcase system 802 integrates the electronic signature functionality. It facilitates the electronic signing process, allowing the user and other involved parties to electronically sign the digital document contract. Showcase system 802 records and stores the electronically signed digital document contract, along with relevant signature details and timestamps. It ensures the integrity and authenticity of the signed contract, providing a secure and auditable record of the agreement. By leveraging the set of digital media item metadata and populating a selected digital document contract template, showcase system 802 enables the creation of a customized and legally binding digital document contract. The electronic signing process adds efficiency, convenience, and security to the contractual workflow, facilitating seamless agreement execution and storage within the system.

At step 930, showcase system 802 requests electronic signature system 808 to obtain one or more electronic signatures on the digital document contract. Showcase system 802 initiates the process by submitting the digital document contract to electronic signature system 808 for signature collection. The contract includes the populated information and terms derived from the set of digital media item metadata.

At step 935, electronic signature system 808 obtains the one or more electronic signatures on the digital document to yield an electronically signed digital document. Electronic signature system 808 receives the contract submission and prepares the necessary components for signature collection. It generates a signature request, which includes the contract document, signing instructions, and any additional information required by the signatories. Electronic signature system 808 sets up the signature workflow based on the requirements specified by showcase system 802. This may include defining the order of signing, specifying the signatories involved, and configuring any additional authentication or verification measures. Electronic signature system 808 sends notifications to the designated signatories, informing them about the pending digital document contract for signature. The notifications may be delivered via email, SMS, or through electronic signature system 808's user interface. Electronic signature system 808 verifies the identity of each signatory to ensure they are authorized to provide an electronic signature. This can involve various authentication methods, such as username/password login, multi-factor authentication, or integration with identity verification services. Electronic signature system 808 provides a user-friendly interface for each signatory to review the digital document contract and apply their electronic signature. The signatories can use methods such as typing their name, uploading a scanned image of their signature, or utilizing a secure digital signature mechanism. Electronic signature system 808 validates each electronic signature to ensure its integrity and authenticity. It verifies the signature against the original document, checks for any tampering or modifications, and performs cryptographic validation as per the chosen signature method. Once all required signatures are obtained, electronic signature system 808 marks the digital document contract as complete. It notifies showcase system 802 of the successful signature collection, providing relevant details such as signatory information, timestamps, and any additional audit trail data. By requesting electronic signature system 808 to facilitate the signature collection process, showcase system 802 ensures the efficient and secure execution of the digital document contract. The integration with electronic signature system 808 streamlines the signing workflow, enhances compliance with legal requirements, and provides a reliable and tamper-evident record of the signed contracts.

At step 940, electronic signature system 808 sends a notification to smart contract generation system 810 that the electronically signed digital document contract is stored at an off-chain address. Once electronic signature system 808 receives the electronically signed digital document contract, it verifies the completion of the signing process and ensures the integrity of the document. Electronic signature system 808 securely stores the electronically signed document contract at an off-chain address, typically in a centralized network file system or a dedicated document management system. This off-chain storage ensures the availability and accessibility of the document while maintaining its integrity. Upon successful storage of the electronically signed document contract, electronic signature system 810 triggers a notification event to inform smart contract generation system 810 about the completed signing process and the location of the document at the off-chain address. Electronic signature system 808 sends the notification to smart contract generation system 810 through a predefined communication channel, such as an API call, message queue, or webhook. The notification includes relevant details, such as the off-chain address where the document contract is stored, and any additional metadata associated with the document. Smart contract generation system 810 receives the notification from electronic signature system 808 and extracts the necessary information, including the off-chain address and any associated metadata. Smart contract generation system 810 integrates the off-chain address and the relevant document metadata into the smart contract it generates. This integration allows the smart contract to reference and access the electronically signed digital document contract during its execution. By sending a notification to smart contract generation system 810 with the off-chain address and associated metadata, electronic signature system 808 enables the seamless integration of the electronically signed digital document contract into the smart contract ecosystem. This integration ensures that the smart contract can refer to and utilize the signed document as needed, providing a comprehensive and reliable framework for enforcing the rights and conditions outlined in the contract.

At step 945, smart contract generation system 810 creates a smart contract generation system, a smart contract comprising a reference to the off-chain address. Smart contract generation system 810 retrieves the off-chain address and associated metadata, such as document contract ID or version, from the notification received from electronic signature system 808. Smart contract generation system 810 selects an appropriate smart contract template that aligns with the specific requirements and rights associated with the digital media item and the electronically signed document contract. In some embodiments, smart contract generation system 810 populates the selected smart contract template with relevant information, including the off-chain address of the electronically signed digital document contract. This customization ensures that the smart contract includes an immutable reference to the document contract. Smart contract generation system 810 compiles the populated smart contract template into executable code. This compilation process may involve converting the smart contract code into a format compatible with the blockchain platform on which it will be deployed. In some embodiments, during the compilation process, smart contract generation system 810 incorporates the immutable reference to the off-chain address of the electronically signed digital document contract into the compiled smart contract. This integration can be done by including the off-chain address as a variable or constant within the smart contract code. Smart contract generation system 810 deploys the compiled smart contract to the chosen blockchain platform, such as Ethereum, Binance Smart Chain, or others. This deployment makes the smart contract a permanent and verifiable part of the blockchain's decentralized and immutable ledger. By creating a smart contract with an immutable reference to the off-chain address of the electronically signed digital document contract, smart contract generation system 810 ensures that the contract can reliably and securely access the signed document. This immutable reference establishes a transparent and auditable connection between the smart contract's execution and the corresponding legally binding document, enhancing the trustworthiness and enforceability of the rights and conditions specified in the contract.

At step 950, smart contract generation system 810 deploys the smart contract to a blockchain. Smart contract generation system 810 compiles the smart contract source code or template into a bytecode or machine-readable format that can be executed by the targeted blockchain platform. This compilation process ensures that the smart contract adheres to the programming language and syntax requirements of the chosen blockchain. Smart contract generation system 810 identifies the specific blockchain network on which the smart contract will be deployed. This could be a public blockchain network like Ethereum or a private blockchain network specifically designed for a particular use case. Smart contract generation system 810 configures the deployment parameters for the smart contract. These parameters are determined by the characteristics of the blockchain network and the requirements of the smart contract. Smart contract generation system 810 creates a deployment transaction, which contains the compiled smart contract bytecode and other necessary information. This transaction is structured according to the protocol and transaction format of the target blockchain network. Smart contract generation system 810 broadcasts the deployment transaction to the network. This involves sending the transaction data to the participating nodes or miners in the blockchain network, who will validate and execute the transaction. The deployed smart contract transaction is included in a block by the network's consensus mechanism. Miners in a proof-of-work blockchain or validators in a proof-of-stake blockchain validate the transaction and add it to a new block. This process requires computational work or consensus among network participants. Once the transaction is confirmed and the block is added to the blockchain, smart contract generation system 810 receives a unique contract address. This address serves as the identifier and entry point for interacting with the deployed smart contract. If necessary, smart contract generation system 810 initializes the deployed smart contract by executing any required setup or initialization functions. This step ensures that the smart contract is ready to receive and process transactions according to its predefined logic. By following these steps, smart contract generation system 810 deploys the compiled smart contract to the targeted blockchain network. Once deployed, the smart contract becomes a part of the blockchain's distributed ledger and is accessible by users and other smart contracts for interaction and execution of predefined operations such as, for example, for minting an NFT for the unique digital asset that is the subject of the smart contract.

In some embodiments, smart contract generation system 810 generates the smart contract using a trained machine learning model such as a trained large language model (LLM). Smart contract generation system 810 prepares a dataset consisting of pairs of natural language descriptions of smart contracts or clauses or sentences thereof and their corresponding executable code snippets or templates. This dataset serves as the training data for the large language model. Smart contract generation system 810 feeds the prepared dataset into the large language model for training. The model learns the patterns, syntax, and semantics of the natural language descriptions and the associated code snippets or templates. In some cases, smart contract generation system 810 may fine-tune the pre-trained large language model using a smaller dataset specific to smart contract generation. This fine-tuning process helps the model better understand the specific domain and context of smart contracts. When generating a smart contract, smart contract generation system 810 prompts the trained large language model with a natural language description or requirements of the desired smart contract. This description may include the desired functionalities, rules, conditions, or other specifications. The trained large language model processes the input prompt and generates the corresponding output, which represents the generated smart contract. The model utilizes its learned knowledge and understanding of smart contract syntax, programming languages, and best practices to produce a code representation that matches the input requirements. The generated smart contract code is post-processed and validated by smart contract generation system 810. This step involves checking for syntactic correctness, resolving ambiguities, ensuring compliance with programming language requirements and best practices, and verifying that the generated code aligns with the intended specifications. Once the generated smart contract code is validated, smart contract generation system 810 follows the deployment process to deploy the smart contract onto the targeted blockchain network. By using a trained large language model, smart contract generation system 810 leverages natural language processing and generation capabilities to convert high-level requirements or descriptions into executable smart contract code. This approach provides flexibility and adaptability in generating smart contracts and can streamline the contract development process by automating parts of the code generation.

In some embodiments, smart contract generation system 810 creates the smart contract to include a mint function configured to perform, upon an invocation of the mint function, recording a new non-fungible token (NFT) record for the digital media item to a blockchain where the new NFT record includes an immutable reference to the off-chain address. Smart contract generation system 810 defines a structure or class that represents the NFT. This structure includes properties such as an identifier, metadata, owner address, and other relevant information for the digital media item. Smart contract generation system 810 creates a mint function within the contract. This function is configured to perform specific actions upon invocation, including recording a new NFT record for the digital media item to the blockchain. Smart contract generation system 810 configures the mint function when invoked to generate a new NFT record for the digital media item. This record includes relevant metadata, such as the off-chain address that stores the digitally signed document contract. This ensures that the off-chain address is included as an immutable reference within the NFT record. This reference may be stored as a variable or property associated with the NFT, providing a permanent link to the off-chain location. Smart contract generation system 810 may initiate a blockchain transaction within the mint function to store the new NFT record on the blockchain. This transaction includes the necessary data to create and validate the NFT record, including the immutable reference. By including a mint function configured to record a new NFT record for the digital media item and storing an immutable reference to the off-chain address, smart contract generation system 810 enables the creation of NFTs and ensures the linkage between the on-chain NFT record and the off-chain electronically signed natural language document contract.

An additional possible step in the smart contract workflow is trading the NFT on an NFT marketplace. When the NFT is traded on the NFT marketplace, the royalty rights including the royalty collection and payment functionality in the smart contract will be invoked and each creator specified in the automated rights contract will be paid the proper amount according to the royalty rights information in the smart contract. In particular, the unique digital asset may be tokenized by minting it as an NFT on a blockchain that supports NFTs such as, for example, an ETHEREUM or a BINANCE blockchain. Then, an NFT marketplace may be selected by a seller where the NFT is listed and traded. Examples of suitable NFT marketplaces include OPENSEA, RARIBLE, SUPERRARE, or the like.

A listing for the NFT on the NFT marketplace is chosen by the seller. The listing may include such information as the NFT's title, description, artwork, media files, or any additional information. The listing may also include a starting price or the NFT may be put up for auction on the NFT marketplace. The NFT marketplace may incorporate the smart contract into the listing process. The smart contract may define the terms and conditions of sale of the NFT, including the royalty payment mechanism to ensure that the creator or co-creators receive a specified percentage of subsequent sales of the NFT. Once approved by the NFT marketplace, the NFT is displayed on the NFT marketplace for potential buyers to discover.

Interested buyers may browse the NFT marketplace and discover the listed NFT. If a buyer is interested in the NFT, they initiate a trade by placing a bid, making an offer, or directly purchasing it at the listed price. If the buyer's bid or offer is accepted by the seller, the trade is executed. The buyer sends the agreed-upon payment, typically in cryptocurrency, to the seller's wallet address provided by the marketplace. Ownership of the NFT is then transferred to the buyer's wallet address.

When the NFT is subsequently resold on the NFT marketplace, the smart contract is invoked to ensure royalty payments to the creator(s) or contributor(s) specified in the smart contract. The smart contract deducts the specified royalty percentage from the sale price and automatically transfers it to the creator's or contributor's wallet address. The NFT can be resold multiple times on the NFT marketplace, and royalty payments are automatically distributed to the creator(s) or contributor(s) each time, according to the terms defined in the smart contract.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
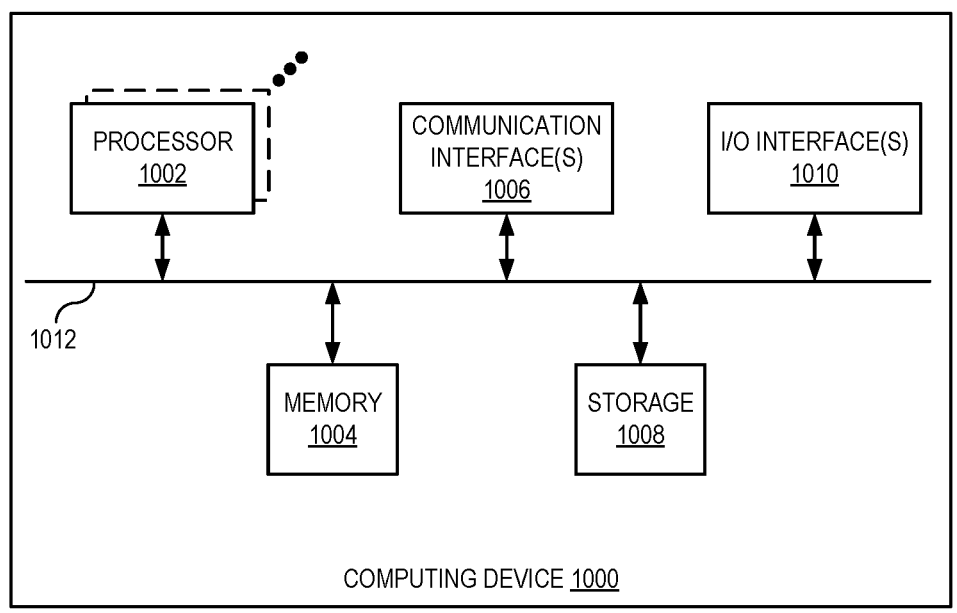
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement CMS 100 or CMS 800. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A system comprising:
    a set of one or more memory components; and
    a set of one or more processing devices coupled to the set of one or more memory components, the set of one or more processing devices to perform operations comprising:
    obtaining one or more electronic signatures on a digital document to yield an electronically signed digital document;
    storing the electronically signed digital document at an off-chain address;
    using a trained machine learning model to create a smart contract, the smart contract comprising a reference to the off-chain address; and
    deploying the smart contract to a blockchain.

2. The system of claim 1, the set of one or more processing devices further to perform operations comprising:
    obtaining a digital media item metadata about a digital media item, the digital media item metadata representing rights in the digital media item; and
    using the digital media item metadata to create the digital document.

3. The system of claim 2, the set of one or more processing devices further to perform operations comprising:
    creating the smart contract to comprise a mint function configured to perform, upon an invocation of the mint function: recording, to the blockchain, a new non-fungible token (NFT) record for the digital media item, the new non-fungible token (NFT) record comprising an immutable reference to the off-chain address.

4. The system of claim 2, the set of one or more processing devices further to perform operations comprising:
    using the digital media item metadata to create the smart contract to comprise self-executing code that enforces rights in the digital media item.

5. The system of claim 2, the set of one or more processing devices further to perform operations comprising:
    providing a computer graphical user interface for obtaining the digital media item metadata;
    wherein the computer graphical user interface provides graphical user interface controls for specifying a contributor to the digital media item;
    wherein the digital media item metadata comprises a particular identity of a particular contributor to the digital media item;
    wherein the digital document comprises the particular identity of the particular contributor to the digital media item; and
    creating the smart contract comprising the particular identity of the particular contributor to the digital media item.

6. The system of claim 5, wherein the particular identity of the particular contributor to the digital media item comprises both: (a) an identity of the particular contributor registered with a content management system, and (b) an identifier of a cryptographic wallet associated with the particular contributor.

7. The system of claim 2, the set of one or more processing devices further to perform operations comprising:
    using the digital media item metadata to generate a natural language text representing rights in the digital media item; and
    using the trained machine learning model to obtain self-executing code for inclusion in the smart contract based on providing, as input to the trained machine learning model, the natural language text representing rights in the digital media item.

8. The system of claim 2, the set of one or more processing devices further to perform operations comprising:
    providing a computer graphical user interface for selecting a digital document template from among a plurality of digital document templates; and
    using the digital media item metadata to create the digital document based on populating a selected digital document template, of the plurality of digital document templates, with the digital media item metadata.

9. A method comprising:
    obtaining digital media item metadata representing rights in a digital media item;
    using the digital media item metadata to create a digital document contract to be electronically signed;
    using a trained machine learning model to create a smart contract, the smart contract comprising a reference to an off-chain address of an electronically signed version of the digital document contract, the electronically signed version of the digital document contract comprising one or more electronic signatures; and
    deploying the smart contract to a blockchain.

10. The method of claim 9, wherein creating the smart contract comprises:
    using the digital media item metadata to generate natural language text representing rights in the digital media item; and
    using the trained machine learning model to obtain self-executing code for inclusion in the smart contract based on providing, as input to the trained machine learning model, the natural language text representing rights in the digital media item.

11. The method of claim 9, further comprising:
    providing a computer graphical user interface for obtaining the digital media item metadata representing rights in the digital media item;
    providing a computer graphical user interface for selecting a digital document contract template from among a plurality of digital document contract templates;
    wherein the digital document contract is created based on populating a selected digital document contract template, of the plurality of digital document contract templates, with the digital media item metadata.

12. The method of claim 9, further comprising:
obtaining the one or more electronic signatures on the digital document contract to yield the electronically signed version of digital document contract;
sending a notification that the electronically signed version of the digital document contract is stored at the off-chain address; and
using the trained machine learning model to generate the smart contract based on receiving the notification that the electronically signed version of the digital document contract is stored at the off-chain address.

13. A non-transitory computer-readable medium storing a set of executable instructions, which when executed by a set of one or more processing devices, cause the set of one or more processing devices to perform operations comprising:
obtaining one or more electronic signatures for a digital document to yield an electronically signed digital document;
storing the electronically signed digital document at an off-chain address;
using a trained machine learning model to create a smart contract, the smart contract comprising a reference to the off-chain address; and
deploying the smart contract to a blockchain.

14. The non-transitory computer-readable medium of claim 13, wherein the set of executable instructions further comprise instructions which, when executed by the set of one or more processing devices, cause the set of one or more processing devices to perform operations comprising:
obtaining digital media item metadata about a digital media item; and
using the digital media item metadata to create the digital document.

15. The non-transitory computer-readable medium of claim 14, wherein the set of executable instructions further comprise instructions which, when executed by the set of one or more processing devices, cause the set of one or more processing devices to perform operations comprising:
creating the smart contract to comprise a mint function configured to perform, upon an invocation of the mint function: recording, to the blockchain, a new non-fungible token (NFT) record for the digital media item, the new non-fungible token (NFT) record comprising an immutable reference to the off-chain address.

16. The non-transitory computer-readable medium of claim 14, wherein the set of executable instructions further comprise instructions which, when executed by the set of one or more processing devices, cause the set of one or more processing devices to perform operations comprising:
using the digital media item metadata to create the smart contract to comprise self-executing code that enforces rights in the digital media item.

17. The non-transitory computer-readable medium of claim 14, wherein the set of executable instructions further comprise instructions which, when executed by the set of one or more processing devices, cause the set of one or more processing devices to perform operations comprising:
providing a computer graphical user interface for obtaining the digital media item metadata;
wherein the computer graphical user interface provides graphical user interface controls for specifying a contributor to the digital media item;
wherein the digital media item metadata comprises a particular identity of a particular contributor to the digital media item;
wherein the digital document comprises the particular identity of the particular contributor to the digital media item; and
creating the smart contract comprising the particular identity of the particular contributor to the digital media item.

18. The non-transitory computer-readable medium of claim 17, wherein the particular identity of the particular contributor to the digital media item comprises both: (a) an identity of the particular contributor registered with a content management system, and (b) an identifier of a cryptographic wallet associated with the particular contributor.

19. The non-transitory computer-readable medium of claim 14, wherein the set of executable instructions further comprise instructions which, when executed by the set of one or more processing devices, cause the set of one or more processing devices to perform operations comprising:
using the digital media item metadata to generate natural language text representing rights in the digital media item; and
using the trained machine learning model to obtain self-executing code for inclusion in the smart contract based on providing, as input to the trained machine learning model, the natural language text representing rights in the digital media item.

20. The non-transitory computer-readable medium of claim 14, wherein the set of executable instructions further comprise instructions which, when executed by the set of one or more processing devices, cause the set of one or more processing devices to perform operations comprising:
providing a computer graphical user interface for selecting a digital document template from among a plurality of digital document templates; and
using the digital media item metadata to create the digital document based on populating a selected digital document template, of the plurality of digital document templates, with the digital media item metadata.

* * * * *